United States Patent
Yun et al.

(10) Patent No.: US 12,272,815 B2
(45) Date of Patent: Apr. 8, 2025

(54) POSITIVE ELECTRODE ACTIVE MATERIAL FOR RECHARGEABLE LITHIUM BATTERY, METHOD OF PREPARING THE SAME, AND RECHARGEABLE LITHIUM BATTERY

(71) Applicant: Samsung SDI Co., Ltd., Yongin-si (KR)

(72) Inventors: Pilsang Yun, Yongin-si (KR); Jongsan Im, Yongin-si (KR); Hyunbeom Kim, Yongin-si (KR); Hanseul Lee, Yongin-si (KR); Do-Yu Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 180 days.

(21) Appl. No.: 18/064,176

(22) Filed: Dec. 9, 2022

(65) Prior Publication Data

US 2023/0307611 A1    Sep. 28, 2023

(30) Foreign Application Priority Data

Mar. 22, 2022    (KR) .......................... 10-2022-0035511

(51) Int. Cl.
*H01M 4/36*    (2006.01)
*H01M 4/04*    (2006.01)
(Continued)

(52) U.S. Cl.
CPC .......... *H01M 4/364* (2013.01); *H01M 4/0471* (2013.01); *H01M 4/366* (2013.01);
(Continued)

(58) Field of Classification Search
CPC .. C01G 53/42; C01P 2004/03; C01P 2004/50; C01P 2004/54; C01P 2004/61;
(Continued)

(56) References Cited

U.S. PATENT DOCUMENTS

| 2014/0158932 A1* | 6/2014 | Sun ........................ H01M 4/139 252/182.1 |
| 2015/0093641 A1 | 4/2015 | Mitsumoto et al. |

(Continued)

FOREIGN PATENT DOCUMENTS

| CN | 111370679 A | 7/2020 |
| CN | 111370681 A | 7/2020 |

(Continued)

OTHER PUBLICATIONS

European Search Report for EP Application No. 22212790.4 dated Aug. 22, 2023, 7 pages.

(Continued)

*Primary Examiner* — Lingwen R Zeng
(74) *Attorney, Agent, or Firm* — Womble Bond Dickinson (US) LLP

(57) ABSTRACT

Provided are a positive electrode active material for a rechargeable lithium battery, a method of preparing the same, and a rechargeable lithium battery including the same. The positive electrode active material for a rechargeable lithium battery includes a lithium nickel-based composite oxide, wherein the positive electrode active material is in a form of a secondary particle in which a plurality of primary particles are aggregated together and at least a portion of the primary particles are radially arranged, the secondary particle includes an inner portion and an outer portion, the inner portion of the secondary particle is a region from a center of the secondary particle to 50±5 length % of the total distance from the center to the surface of the secondary particle, and is a region in which primary particles and pores are irregularly arranged.

16 Claims, 19 Drawing Sheets

(51) Int. Cl.
*H01M 4/505* (2010.01)
*H01M 4/525* (2010.01)
*C01G 53/42* (2025.01)
*H01M 4/02* (2006.01)
*H01M 10/0525* (2010.01)

(52) U.S. Cl.
CPC ........... *H01M 4/505* (2013.01); *H01M 4/525* (2013.01); *C01G 53/42* (2013.01); *C01P 2004/03* (2013.01); *C01P 2004/50* (2013.01); *C01P 2004/54* (2013.01); *C01P 2004/61* (2013.01); *C01P 2006/40* (2013.01); *H01M 2004/021* (2013.01); *H01M 2004/028* (2013.01); *H01M 10/0525* (2013.01); *Y02E 60/10* (2013.01)

(58) Field of Classification Search
CPC ........... C01P 2006/40; H01M 10/0525; H01M 2004/021; H01M 2004/028; H01M 4/0471; H01M 4/364; H01M 4/366; H01M 4/505; H01M 4/525; Y02E 60/10
See application file for complete search history.

(56) References Cited

U.S. PATENT DOCUMENTS

| | | |
|---|---|---|
| 2016/0006031 A1 | 1/2016 | Kaseda et al. |
| 2016/0172674 A1 | 6/2016 | Oda et al. |
| 2018/0026268 A1 | 1/2018 | Kim et al. |
| 2018/0048015 A1 | 2/2018 | Lee et al. |
| 2018/0108940 A1 | 4/2018 | Kwon et al. |
| 2018/0212237 A1 | 7/2018 | Lee et al. |
| 2019/0074513 A1 | 3/2019 | Ham et al. |
| 2019/0260024 A1 | 8/2019 | Nakamura et al. |
| 2019/0393502 A1 | 12/2019 | Yun et al. |
| 2020/0152981 A1 | 5/2020 | Kim et al. |
| 2020/0343552 A1 | 10/2020 | Kim et al. |
| 2020/0350582 A1 | 11/2020 | Kim et al. |
| 2020/0403239 A1 | 12/2020 | Sun et al. |
| 2020/0403240 A1 | 12/2020 | Sun |
| 2021/0017039 A1 | 1/2021 | Nagao et al. |
| 2021/0057731 A1 | 2/2021 | Choi et al. |
| 2021/0135215 A1 | 5/2021 | Kil |
| 2021/0167380 A1 | 6/2021 | Choi et al. |
| 2021/0234155 A1 | 6/2021 | Jeong et al. |
| 2021/0336252 A1 | 10/2021 | Lang |
| 2022/0166016 A1 | 5/2022 | Sun et al. |

FOREIGN PATENT DOCUMENTS

| | | | |
|---|---|---|---|
| CN | 113193186 A | 7/2021 | |
| EP | 3 989 316 A1 | 4/2020 | |
| EP | 3828139 A1 | 6/2021 | |
| EP | 3905393 A1 | 11/2021 | |
| EP | 4 030 505 A1 | 7/2022 | |
| JP | 1994-288716 A | 10/1999 | |
| JP | 2000-243394 A | 9/2000 | |
| JP | 2019-169374 A | 10/2019 | |
| KR | 10-2013-0138073 A | 12/2013 | |
| KR | 10-2013-0138147 A | 12/2013 | |
| KR | 10-2014-0011414 A | 1/2014 | |
| KR | 10-2015-0121010 A | 10/2015 | |
| KR | 10-2016-0129764 A | 11/2016 | |
| KR | 10-2017-0038485 A | 4/2017 | |
| KR | 10-2017-0103699 A | 9/2017 | |
| KR | 10-2019-0008156 A | 1/2019 | |
| KR | 10-2019-0026571 A | 3/2019 | |
| KR | 10-2019-0032119 A | 3/2019 | |
| KR | 10-2019-0035716 A | 4/2019 | |
| KR | 10-2019-0086403 A | 7/2019 | |
| KR | 10-2019-0092281 A | 8/2019 | |
| KR | 10-2019-0129518 A | 11/2019 | |
| KR | 10-2020-001082 A | 1/2020 | |
| KR | 10-2020-0056341 A | 5/2020 | |
| KR | 10-2020-0092273 A | 8/2020 | |
| KR | 2020092273 A * | 8/2020 | ........... C01G 53/006 |
| KR | 10-2020-0108080 A | 9/2020 | |
| KR | 10-2021-0007808 A | 1/2021 | |
| KR | 10-2021-0022199 A | 3/2021 | |
| KR | 10-2021-0048436 A | 5/2021 | |
| KR | 10-2021-0052320 A | 5/2021 | |
| KR | 10-2021-0067842 A | 6/2021 | |
| KR | 2021067842 A * | 6/2021 | ............ C01G 53/42 |
| KR | 10-2021-0083202 A | 7/2021 | |
| KR | 10-2278009 B1 | 7/2021 | |
| WO | 2016/002158 A1 | 7/2016 | |

OTHER PUBLICATIONS

Office Action dated Aug. 23, 2024 of the corresponding Korean Patent Application No. 10-2022-0035511, 7pp.

* cited by examiner

POSITIVE ELECTRODE ACTIVE MATERIAL FOR RECHARGEABLE LITHIUM BATTERY, METHOD OF PREPARING THE SAME, AND RECHARGEABLE LITHIUM BATTERY

CROSS-REFERENCE TO RELATED APPLICATION

This application claims priority to and the benefit of Korean Patent Application No. 10-2022-0035511 filed in the Korean Intellectual Property Office on Mar. 22, 2022, the entire contents of which are hereby incorporated by reference.

BACKGROUND

1. Field

Embodiments of the present disclosure provide a positive electrode active material for a rechargeable lithium battery, a method of preparing the same, and a rechargeable lithium battery including the same.

2. Description of the Related Art

A portable information device such as a cell phone, a laptop, a smart phone, and the like, or, for example, an electric vehicle, has used a rechargeable lithium battery having high energy density and easy portability as a driving power source. Recently, research has been actively conducted to use a rechargeable lithium battery having high energy density as a driving power source and/or power storage power source for hybrid or electric vehicles.

As a positive electrode active material for a rechargeable lithium battery, a lithium nickel-based oxide such as a lithium nickel manganese cobalt composite oxide, a lithium cobalt oxide, and/or the like has been used. When such a positive electrode active material is used, a long-term cycle-life of the positive electrode active material decreases, a resistance thereof increases, and capacity characteristics do not reach a satisfactory level due to cracks generated in the positive electrode active material as charging and discharging are repeated, and thus, improvement is desired.

SUMMARY

Provided are a positive electrode active material for a rechargeable lithium battery that realizes a high capacity, has high initial charge/discharge efficiency, and has improved high-temperature cycle-life characteristics, and a rechargeable lithium battery including the same.

In an embodiment, a positive electrode active material for a rechargeable lithium battery includes a lithium nickel-based composite oxide, wherein the positive electrode active material is in a form of a secondary particle in which a plurality of primary particles are aggregated together and at least a portion of the primary particles are radially arranged, the secondary particle includes an inner portion and an outer portion, the inner portion of the secondary particle is a region from a center of the secondary particle to 50±5 length % of the total distance from the center of the secondary particle to the surface of the secondary particle, and is a region in which primary particles and pores are irregularly arranged, the outer portion of the secondary particle is a region surrounding the inner portion, wherein at least a portion of the primary particles are radially arranged in the outer portion, a number ratio of the primary particles having an aspect ratio of greater than or equal to about 4 in the outer portion of the secondary particle is greater than or equal to about 18%.

In another embodiment, a method of preparing positive electrode active material for a rechargeable lithium battery includes heat-treating a mixture of a positive electrode active material precursor including a nickel-based composite hydroxide and a lithium raw material, wherein the heat-treating includes a temperature-raising process and a temperature-maintaining process, and a temperature-raising time is longer than a temperature-maintaining time.

In another embodiment, a rechargeable lithium battery including a positive electrode including the aforementioned positive electrode active material, a negative electrode, and an electrolyte.

The positive electrode active material and the rechargeable lithium battery including the same according to embodiments have high initial charge/discharge efficiency while realizing a high capacity, and have excellent room-temperature and high-temperature cycle-life characteristics.

BRIEF DESCRIPTION OF THE DRAWINGS

The accompanying drawings, together with the specification, illustrate embodiments of the subject matter of the present disclosure, and, together with the description, serve to explain principles of embodiments of the subject matter of the present disclosure.

DETAILED DESCRIPTION

Figure 1A:
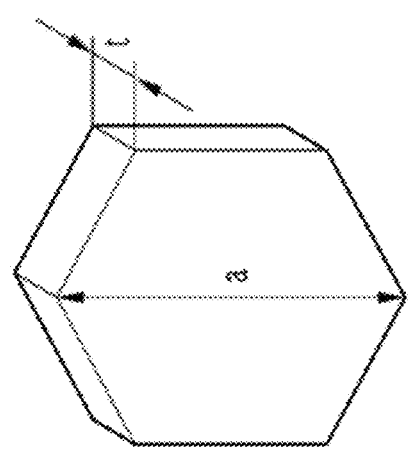
FIGS. 1A-1C are schematic views showing example shapes of plate-shaped primary particles.

Hereinafter, example embodiments will be described in more detail so that those of ordinary skill in the art can easily implement them. However, the subject matter of this disclosure may be embodied in many different forms and should not be construed as being limited to the example embodiments set forth herein.

The terminology used herein is used to describe embodiments only, and is not intended to limit the present disclosure. The singular expression includes the plural expression unless the context clearly dictates otherwise.

As used herein, the term "combination thereof" means a mixture, laminate, composite, copolymer, alloy, blend, reaction product, and/or the like of the constituents described.

Here, it should be understood that terms such as "comprises," "includes," or "have" are intended to designate the presence of an embodied feature, number, step, element, or a combination thereof, but do not preclude the possibility of the presence or addition of one or more other features, number, step, element, or a combination thereof.

In the drawings, the thickness of layers, films, panels, regions, etc., may be exaggerated for clarity and like reference numerals designate like elements throughout the specification. It will be understood that when an element such as a layer, film, region, or substrate is referred to as being "on" another element, it can be directly on the other element or intervening elements may also be present. In contrast, when an element is referred to as being "directly on" another element, there are no intervening elements present.

In addition, the term "layer," as used herein, includes not only a shape formed on the whole surface when viewed from a plan view, but also a shape formed on a partial surface.

In addition, the average particle diameter and the average size may be measured by any suitable method generally used in the art, for example, may be measured by a particle size analyzer, or may be measured by a transmission electron microscopic image and/or a scanning electron microscopic image. In some embodiments, it is possible to obtain an average particle diameter value by measuring a size using a dynamic light scattering method, performing data analysis, counting the number of particles for each particle size range, and calculating from the result. Unless otherwise defined, the term "average particle diameter," as used herein, may mean the diameter (D50) of particles having a cumulative volume of 50 volume % in a particle size distribution as measured by a particle size analyzer.

Here, "or" is not to be construed as an exclusive meaning, for example, "A or B" is construed to include A, B, A+B, and the like.

Positive Electrode Active Material

In an embodiment, a positive electrode active material for a rechargeable lithium battery includes a lithium nickel-based composite oxide, wherein the positive electrode active material is in a form of a secondary particle in which a plurality of primary particles are aggregated together and at least a portion of the primary particles are radially arranged, the secondary particle includes an inner portion and an outer portion surrounding the inner portion, and a number ratio of the primary particles having an aspect ratio of greater than or equal to about 4 in the outer portion is greater than or equal to about 18%. Here, the ratio means a ratio of the number of primary particles having an aspect ratio of greater than or equal to about 4 among those existing in the outer portion of the secondary particle to the total number of primary particles existing in the outer portion of the secondary particle. For example, 18% or more of the primary particles in the outer portion of the secondary particle may have an aspect ratio greater than or equal to about 4, based on the total number of primary particles in the outer portion of the secondary particle.

The inner portion of the secondary particle is a region in which primary particles and pores are irregularly arranged, and refers to a region from a center of the secondary particle to 50±5 length % of the total distance from the center to the surface of the secondary particle. The outer portion of the secondary particle means a region in which at least a portion of the primary particles are radially arranged as the remaining region surrounding the interior (e.g., the inner portion of the secondary particle).

Here, the total distance from the center to the surface of the secondary particle may be measured through an electron microscopic image, such as a scanning electron microscope (SEM) image, of the surface or cross-section of the secondary particle. In addition, the region from the center to 50±5 length % may be said to be a region from the center to 45 length % to 55 length %, and may be expressed as a region from the center to about 50 length %. For example, the ratio of a diameter of the inner portion to the total diameter of the secondary particle may be about 45% to about 55%, about 50% to about 55%, or about 50%. Here, the diameter of the secondary particle and the diameter of the inner portion of the secondary particle may be measured by electron microscopic images of the cross-section of the secondary particle. For example, by cutting the secondary particle with a focused ion beam (FIB) and observing the cross-section with a scanning electron microscope (SEM), the diameter of the secondary particle and the diameter of the inner portion may be measured.

Figure 1B:
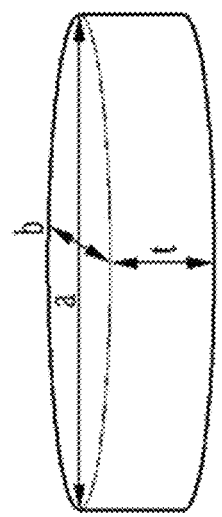
Figure 1C:
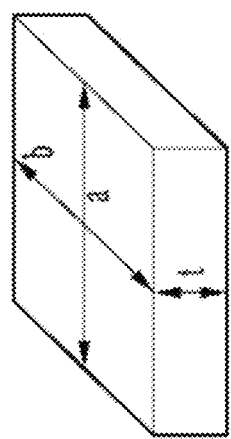

The secondary particle may include plate-shaped primary particles. FIGS. 1A-1C are schematic views showing examples of plate-shaped primary particles. Referring to FIGS. 1A-1C, the primary particles may have various suitable shapes while having a basic plate structure, such as, for example, FIG. 1A showing a polygonal nanoplate shape such as a hexagon, FIG. 1B showing a nanodisk shape, and FIG. 1C a rectangular parallelepiped shape.

In FIGS. 1A-1C, "a" means a length of a long axis of the primary particle, and, in FIGS. 1B-1C, "b" means a length of a short axis, and "t" means a thickness. Here, the length (a) of the long axis means a maximum length with respect to the widest surface of the primary particle. The thickness (t) may be a maximum length of a surface that is perpendicular or approximately perpendicular to the widest surface of the primary particle. A direction containing the length (a) of the long axis and the length (b) of the short axis is defined as a plane direction, and a direction in which the thickness (t) is defined is defined as a thickness direction.

The thickness (t) of the primary particles may be smaller than the length (a) of the long axis and the length (b) of the short axis, which are lengths in the plane direction. The length (a) of the long axis among the lengths in the plane direction may be longer or the same as the length (b) of the short axis.

Figure 2:
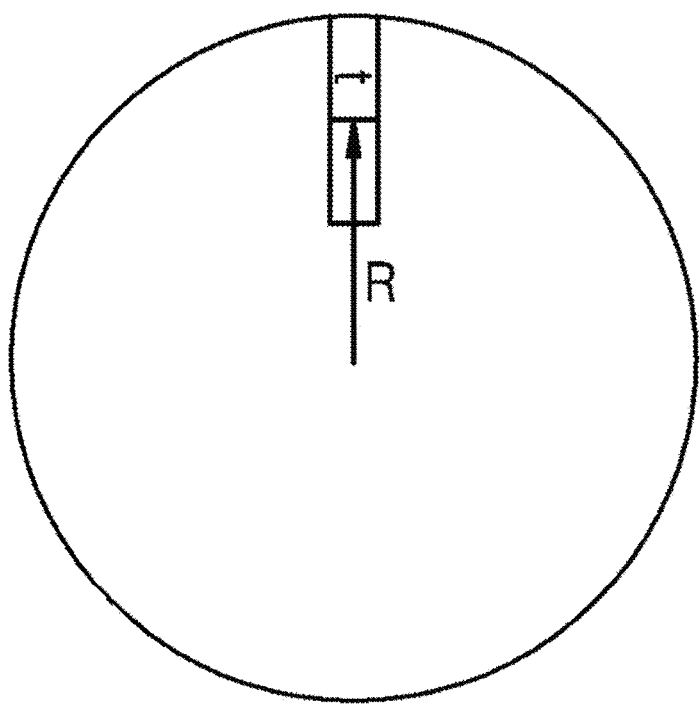
FIG. 2 is a view illustrating a definition of the term "radial" in secondary particles.

In the positive electrode active material, at least a portion of the primary particles may have a radially arranged structure, and for example, long axes of the primary particles may be arranged in a radial direction relative to the secondary particle. FIG. 2 is a view illustrating a definition of the term "radial" in a secondary particle according to an embodiment (e.g., illustrating a radially arranged primary particle in a secondary particle). In an embodiment, the radially arranged structure means that, as shown in FIG. 2, the thickness (t) direction of the primary particles is perpendicular to or within an angle of about ±5° of perpendicular to the Direction® from the secondary particle from the center of the secondary particle to the surface.

In this way, when at least a portion of the primary particles are radially arranged, because the secondary particles have a large number of crystal planes, which transmit lithium to the outside, exposed to the surface and pores, which serve as a lithium diffusion passage, also exposed to the surface, lithium diffusion may be improved, thereby securing high initial efficiency and high capacity. In addition, the pores exposed onto the surface of the secondary particle are directed toward a center of the secondary particle, which further promotes the lithium diffusion (e.g., toward the center of the secondary particle).

Due to the radially arranged primary particles, uniform (or substantially uniform) contraction and expansion of the positive electrode active material are possible when lithium is deintercalated and/or intercalated, and when lithium is deintercalated, more pores exist in the (001) direction, which is the direction in which the particles expand, so that they act as a buffer. Accordingly, probability of cracks occurring during contraction and expansion of the positive electrode active material is lowered, and internal pores further mitigate volume change, thereby reducing cracks generated between primary particles during charging and discharging. Accordingly, cycle-life characteristics of the rechargeable lithium battery may be improved and an increase in resistance may be reduced.

The secondary particle includes an inner portion and an outer portion surrounding the inner portion. The secondary particles of the positive electrode active material may include, for example, an inner portion having an irregular porous structure and an outer portion having a structure that a least a portion of the primary particles are radially arranged, for example, a radially arranged structure. For example, the primary particles at the inner portion may be randomly arranged with respect to one another. The irregular porous structure is a structure having the primary particles and pores wherein a size, a shape, a position, and/or the like of the primary particles are irregular (e.g., random or not ordered). In this inner portion, the primary particles may be arranged without regularity, unlike the outer portion.

The positive electrode active material having this structure has a porous structure in the inner portion, so that a diffusion distance of lithium ions to the inner portion is reduced, and the pores may have an effect of alleviating or reducing volume changes between the primary particles occurring during charge and discharge. In addition, in the positive electrode active material, the primary particles in the outer portion are radially arranged, so lithium ions may be easily intercalated into the surface, and a stress according to the volume changes may be minimized or reduced during charge and discharge. This positive electrode active material may reduce resistance of a rechargeable lithium battery and improve charge and discharge efficiency and cycle-life characteristics thereof.

In the secondary particles of the positive electrode active material, the inner portion may include pores having a larger size than those of the outer portion. For example, the pores in the inner portion may have a size of about 150 nm to about 1 μm, and the pores in the outer portion may have a size of less than about 150 nm. Here, in the outer portion, lithium ions may be easily intercalated, while in the inner portion, a lithium diffusion distance may be short, and there is an effect of alleviating or reducing volume changes of the positive electrode active material during charge and discharge. Here, the pores may have a size which is a diameter, when spherical and/or circular, and a length of a long axis when oval and/or the like, wherein the size is measured with an electron microscope such as SEM and/or the like.

In addition, the secondary particles of the positive electrode active material may have open pores on the surface. The open pores may be pores of which a portion of walls are not closed, and the open pores on the surface may be connected to the outside and work as a passage through which a material comes in and out. These open pores may have a size of less than about 150 nm, for example, about 10 nm to about 148 nm. Because the primary particles in the outer portion of the secondary particles are radially arranged, the open pores on the surface may be in the form of facing a center of the secondary particle from the surface of the secondary particle. The open pores may have a depth of less than or equal to about 150 nm, for example, about 0.1 nm to about 100 nm, for example, about 1 nm to about 50 nm from the surface of the secondary particle. Here, the size and depth of the open pores may be measured by the BJH (Barrett, Joyner and Halenda) method, which is a method derived from the content of adsorbed or desorbed nitrogen.

The closed pores may exist in the inner portion of the secondary particle, and closed pores and/or open pores may exist in the outer portion. The closed pores may exclude or mostly exclude an electrolyte, while the open pores may include an electrolyte therein. The closed pores may be referred to as independent pores that are not connected to other pores because all of the walls of the closed pores are formed in a closed structure.

In the positive electrode active material according to an embodiment, a number ratio of the primary particles having an aspect ratio of greater than or equal to about 4 in the outer portion of the secondary particle is greater than or equal to about 18%. As this positive electrode active material is more advantageous for movement of lithium ions, stress due to contraction and expansion is minimized or reduced and, for example, structural stability at a high temperature is improved, and concurrently (e.g., simultaneously), high-capacity may be realized. Accordingly, capacity of a rechargeable lithium battery may be increased, while charge and discharge efficiency and high-temperature cycle-life characteristics may be improved.

Herein, the aspect ratio of the primary particles means an aspect ratio on the cross-sections of the primary particles observed in the cross-section of the secondary particle, which may be measured from an electron microscopic image of the cross-section of the positive electrode active material secondary particle through an image analysis program. For example, the secondary particle is cut with a focused ion beam (FIB), and an image of a cross-section is taken with a scanning electron microscope (SEM), and the scanning electron microscope image of the primary particles is contour-processed with an image analysis program, Image J to measure the aspect ratio of the contour-processed primary particles.

The aspect ratio of the primary particle may be measured with various suitable image programs, for example, the Image J program. Image J is a software produced by the US National Institutes of Health, etc. and may be downloaded from a site of https://imagej.net/ImageJ, and for further description thereof, refer to a site of https://en.Wikipedia.org/wiki/ImageJ and the like.

In some embodiments, a method of obtaining the number ratio of the primary particles having an aspect ratio of greater than or equal to about 4 in the outer portion of the secondary particle may be, for example, as follows. In the electron microscopic image of the cross-section of the secondary particle cut with FIB, the primary particles are contoured with the Image J program. In the contoured image, the inner and outer portions of the secondary particle are distinguished. Herein, the inner portion is defined as a region from a center of the secondary particle to about 50 length % of a total distance from the center to the surface of the secondary particle, and the other region excluding the inner portion is defined as the outer portion, wherein primary particles spanning 50 length %, for example, at the boundary are defined to be included in the inner portion. Subsequently, all the aspect ratios of the primary particles contoured by using the Image J program in each inner and outer portion are measured to analyzed an aspect ratio distribution. Herein, the number ratio of the primary particles having an aspect ratio of greater than or equal to about 4 and the like in the outer portion of the secondary particle may be derived.

Figure 3:
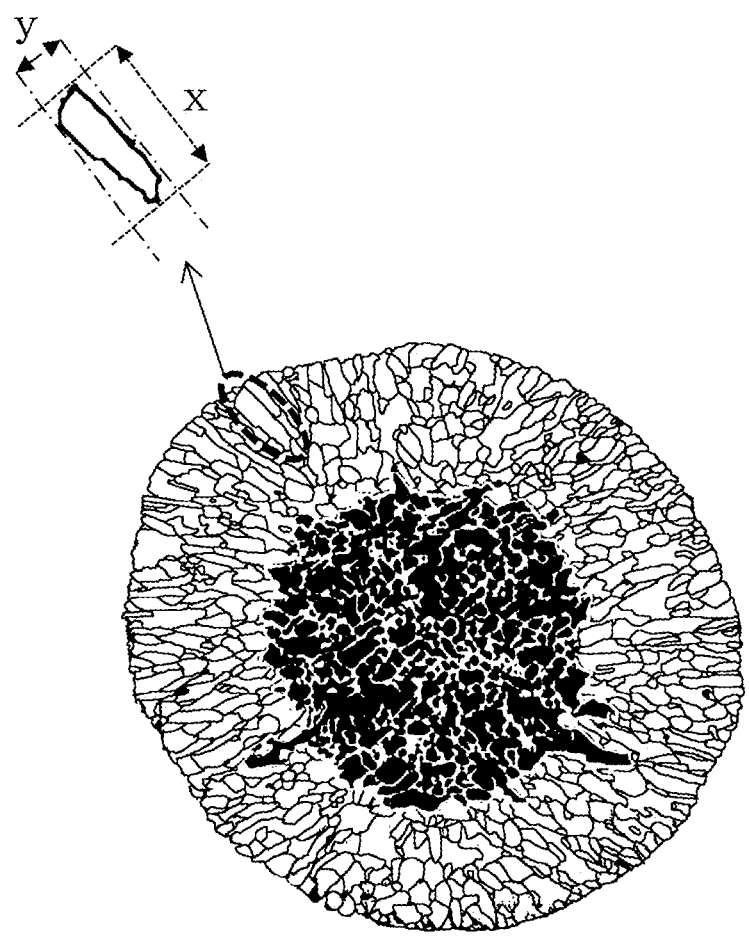
FIG. 3 is a view illustrating a cross-section of the secondary particles and an aspect ratio of the primary particles.

FIG. 3 is a view illustrating a cross-section of the secondary particles and the aspect ratio of the primary particles according to an example. FIG. 3 is an image obtained by contour-processing primary particles using the Image J program in an SEM image of a cross-section of the positive electrode active material according to an embodiment which is cut with FIB. The black portion represents the inner portion of the secondary particle and the white portion represents the outer portion of the secondary particle. Herein, one of the primary particles is enlarged and shown at the top of FIG. 3. In the selected primary particle, two parallel lines are drawn to form a sandwich shape, and the longest length (long axis; horizontal axis; width; longer side) between these two parallel lines is called "x", while a vertical length (short axis; vertical axis; height; shorter side) is called "y". Herein, an aspect ratio of the primary particle means a ratio of x to y, for example, x/y.

The number ratio of the primary particles having an aspect ratio of greater than or equal to about 4 in the outer portion of the secondary particle may be for example about 18% to about 45%, about 18% to about 40%, about 18% to about 35%, or about 18% to about 30%, based on the total number of primary particles in the outer portion of the secondary particle. When the number ratio of the primary particles having an aspect ratio of greater than or equal to about 4 satisfies this range, the positive electrode active material may exhibit high initial charge/discharge efficiency and excellent high-temperature cycle-life characteristics while realizing a high capacity.

Furthermore, a number ratio of the primary particles having an aspect ratio of less than or equal to about 2.5 in the outer portion of the secondary particle may be less than or equal to about 54%, for example about 20% to about 54%, about 30% to about 54%, or about 35% to about 54%, based on the total number of primary particles in the outer portion of the secondary particle.

A number ratio of the primary particles having an aspect ratio of greater than about 2.5 and less than about 4 may be for example about 1% to about 62%, about 6% to about 62%, about 11% to about 62%, about 16% to about 62%, about 1% to about 52%, or about 1% to about 47%, based on the total number of primary particles in the outer portion of the secondary particle.

When the aspect ratio of the primary particles in the outer portion of the secondary particles exhibits such a distribution, the positive electrode active material may exhibit high initial charge/discharge efficiency and excellent high-temperature cycle-life characteristics while realizing a high capacity.

The inner and outer portions of the secondary particle may exhibit different aspect ratio distributions of primary particles. For example, the number ratio of the primary particles having an aspect ratio of greater than or equal to about 4 in the outer portion of the secondary particle may be three times or more of a number ratio of the primary particles having an aspect ratio of greater than or equal to about 4 in the inner portion of the secondary particle.

In addition, a number ratio of the primary particles having an aspect ratio of greater than or equal to about 4 in the inner portion of the secondary particle may be less than about 18%, for example less than or equal to about 15%, or about 5% to about 15%, or about 5% to about 10%, based on the total number of primary particles in the inner portion of the secondary particle.

In the inner portion of the secondary particle, a number ratio of the primary particles having an aspect ratio of less than or equal to about 2.5 may be less than or equal to about 71%, for example about 40% to about 71%, about 50% to about 71%, or about 60% to about 71%, based on the total number of primary particles in the inner portion of the secondary particle.

When each inner and outer portion of the secondary particle exhibits an aspect ratio distribution of the primary particles as described herein, the positive electrode active material may exhibit high initial charge and discharge efficiency and excellent high-temperature cycle-life characteristics as well as realize high-capacity.

In some embodiments, a positive electrode active material for a rechargeable lithium battery includes a lithium nickel-based composite oxide, in which a plurality of primary particles are aggregated together into a secondary particle, and at least a portion of the primary particles are radially arranged, wherein in the cross-section of the secondary particle, a number ratio of primary particles having a cross-sectional area of less than about 0.1 µm² is about 70% or more, based on the total number of primary particles in the secondary particle.

This positive electrode active material may easily secure a lithium transfer path between the primary particles, and pores between the primary particles alleviate or reduce a volume change of the positive electrode active material during charge and discharge, thereby minimizing or reducing stress resulting from volume change. Accordingly, resistance of the rechargeable lithium battery may be reduced, but capacity characteristics and cycle-life characteristics may be improved.

Herein, the cross-sectional area of the primary particles may be measured from an electron microscopic image of the cross-section of the secondary particle with an image program, for example, measured by contouring the primary particles on the cross-section of the secondary particle with an Image J program in an SEM image of the positive electrode active material cut with a focused ion beam (FIB). In some embodiments, the SEM image of the FIB cross-section of the secondary particle is input to a computer to contour the primary particles with an Image J program, and areas of all the contoured primary particles are measured to analyze an area distribution, from which the number ratio of primary particles having a cross-sectional area of less than about 0.1 µm² and the like may be derived.

The ratio of the number of primary particles having a cross-sectional area of less than 0.1 µm² in the cross-section of the secondary particle may be, for example, about 70% to about 90%, about 70% to about 85%, or about 70% to about 80%, based on the total number of primary particles in the secondary particle.

In addition, in the cross-section of the secondary particle, a ratio of the number of primary particles having a cross-sectional area of greater than about 0.3 µm² may be less than or equal to about 5%, for example about 0% to about 5%, about 0.1% to about 5%, or about 1% to about 5%, based on the total number of primary particles in the secondary particle.

In the cross-section of the secondary particle, a ratio of the number of primary particles having a cross-sectional area of about 0.1 µm² to about 0.3 µm² may be about 5% to about 30%, about 10% to about 29.9%, or about 15% to about 29%, based on the total number of primary particles in the secondary particle.

When the cross-sectional area of the primary particles has such a distribution, the positive electrode active material may exhibit high initial charge/discharge efficiency and excellent high-temperature cycle-life characteristics while realizing a high capacity.

The average particle diameter of the secondary particle of the positive electrode active material may be about 8 µm to about 20 µm, for example, about 8 µm to about 18 µm, or about 10 µm to about 15 µm. Here, the positive electrode active material may realize high capacity and exhibit high initial charge/discharge efficiency and cycle-life characteristics.

Here, the average particle diameter of the secondary particles may be measured by a laser diffraction method by mixing and dispersing the positive electrode active material in water together with a dispersing agent, and for example, it may be measured using a Beckman Coulter's LS 13 320 particle size analyzer. A particle size distribution is obtained through a particle size analyzer, and the D50 value, which is the particle size at a point where the cumulative volume is 50 volume %, may be taken as the average particle diameter.

In some embodiments, the cross-section data of the primary particle may be analyzed by selecting the secondary particles as an example as follows. Particles having a size similar to D50 measured by the laser diffraction method in the electron microscopic image of the positive electrode active material are selected. The selected particles are cut with FIB and cross-sections are taken with an electron microscope, and then the primary particles are contour-processed using an image program such as Image J. Here, the region from the center of the secondary particle to 50 length % is defined as the inner portion of the secondary particle, and the region other than the inner portion is defined as the outer portion of the secondary particle and the primary particles at the 50 length % boundary are defined to be included in the inner portion, and thereby aspect ratios of the primary particles in the inner portion and the outer portion may be analyzed respectively. In addition, cross-sectional areas of the primary particles in the entire cross-section of the secondary particle may be analyzed.

The lithium nickel-based composite oxide may be represented by Chemical Formula 1.

$$\text{Li}_{a1}\text{Ni}_{x1}\text{M}^1_{y1}\text{M}^2_{1-x1-y1}\text{O}_{2-z}\text{X}_z \quad \text{Chemical Formula 1}$$

In Chemical Formula 1, $0.9 \leq a1 \leq 1.8$, $0.3 \leq x1 \leq 1$, $0 \leq y1 \leq 0.7$, and $0 \leq z \leq 0.1$, $M^1$ and $M^2$ are each independently at least one element selected from Al, B, Ba, Ca, Ce, Co, Cr, Fe, Mg, Mn, Mo, Nb, Si, Sr, Ti, V, W, and Zr, and X is at least one element selected from F, P, and S.

In Chemical Formula 1, $0.4 \leq x1 \leq 1$ and $0 \leq y1 \leq 0.6$, $0.5 \leq x1 \leq 1$ and $0 \leq y1 \leq 0.5$, $0.6 \leq x1 \leq 1$ and $0 \leq y1 \leq 0.4$, or $0.7 \leq x1 \leq 1$ and $0 \leq y1 \leq 0.3$, $0.8 \leq x1 \leq 1$ and $0 \leq y1 \leq 0.2$, or $0.9 \leq x1 \leq 1$ and $0 \leq y1 \leq 0.1$.

The lithium nickel-based composite oxide may be, for example, represented by Chemical Formula 2.

$$\text{Li}_{a2}\text{Ni}_{x2}\text{Co}_{y2}\text{M}^3_{1-x2-y2}\text{O}_{2-z}\text{X}_z \quad \text{Chemical Formula 2}$$

In Chemical Formula 2, $0.9 \leq a2 \leq 1.8$, $0.3 \leq x2 < 1$, $0 < y2 \leq 0.7$, and $0 \leq z \leq 0.1$, $M^3$ is at least one element selected from Al, B, Ba, Ca, Ce, Cr, Fe, Mg, Mn, Mo, Nb, Si, Sr, Ti, V, W, and Zr, and X is at least one element selected from F, P, and S.

In Chemical Formula 2, $0.3 \leq x2 \leq 0.99$ and $0.01 \leq y2 \leq 0.7$, $0.4 \leq x2 \leq 0.99$ and $0.01 \leq y2 \leq 0.6$, $0.5 \leq x2 \leq 0.99$ and $0.01 \leq y2 \leq 0.5$, or $0.6 \leq x2 \leq 0.99$ and $0.01 \leq y2 \leq 0.4$, $0.7 \leq x2 \leq 0.99$ and $0.01 \leq y2 \leq 0.3$, $0.8 \leq x2 \leq 0.99$ and $0.01 \leq y2 \leq 0.2$, or $0.95 \leq x2 \leq 0.99$ and $0.01 \leq y2 \leq 0.1$.

The lithium nickel-based composite oxide may be, for example, represented by Chemical Formula 3.

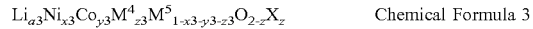

$$\text{Li}_{a3}\text{Ni}_{x3}\text{Co}_{y3}\text{M}^4_{z3}\text{M}^5_{1-x3-y3-z3}\text{O}_{2-z}\text{X}_z \quad \text{Chemical Formula 3}$$

In Chemical Formula 3, $0.9 \leq a3 \leq 1.8$, $0.3 \leq x3 \leq 0.98$, $0.01 \leq y3 \leq 0.69$, $0.01 \leq z3 \leq 0.69$, and $0 \leq z \leq 0.1$, $M^4$ is at least one element selected from Al, and Mn, $M^5$ is at least one element selected from B, Ba, Ca, Ce, Cr, Fe, Mg, Mo, Nb, Si, Sr, Ti, V, W, and Zr, and X is at least one element selected from F, P, and S.

In Chemical Formula 3, $0.4 \leq x3 \leq 0.98$, $0.01 \leq y3 \leq 0.59$, and $0.01 \leq z3 \leq 0.59$, may be $0.5 \leq x3 \leq 0.98$, $0.01 \leq y3 \leq 0.49$, and $0.01 \leq z3 \leq 0.49$, or $0.6 \leq x3 \leq 0.98$, $0.01 \leq y3 \leq 0.39$, and $0.01 \leq z3 \leq 0.39$, or $0.7 \leq x3 \leq 0.98$, $0.01 \leq y3 \leq 0.29$, and $0.01 \leq z3 \leq 0.29$, or $0.8 \leq x3 \leq 0.98$, $0.01 \leq y3 \leq 0.19$, and $0.01 \leq z3 \leq 0.19$, or $0.9 \leq x3 \leq 0.98$, $0.01 \leq y3 \leq 0.09$, and $0.01 \leq z3 \leq 0.09$.

Method for Preparing Positive Electrode Active Material

In an embodiment, a method of preparing a positive electrode active material for a rechargeable lithium battery includes mixing together a positive electrode active material precursor including a nickel-based composite hydroxide and a lithium raw material, and heat-treating the resultant.

The positive electrode active material precursor may be prepared by a co-precipitation method. In other words, a nickel raw material and optionally, a metal raw material other than the nickel raw material are mixed together to prepare a composite metal raw material, and then, a complexing agent and a pH controlling agent are added thereto to control pH of the mixture and perform a co-precipitation reaction, preparing a nickel-based composite hydroxide having a desired composition.

The complexing agent serves to control a reaction rate of the formation of a precipitate in the co-precipitation reaction, and may be, for example, ammonium hydroxide (NH$_4$OH), and/or citric acid.

The pH controlling agent may be, for example, sodium hydroxide (NaOH), sodium carbonate (Na$_2$CO$_3$), sodium oxalate (Na$_2$C$_2$O$_4$), and/or the like. The pH of the mixture may be adjusted, for example, in the range of about 10 to about 13.

The co-precipitation reaction may proceed in several steps, for example, 2 steps, 3 steps, or 4 steps. In each step, a concentration of the complexing agent, an input rate of the composite metal raw material, the pH range, a reaction temperature, reaction time, stirring power, and the like may be differently adjusted. Through these adjustments, a secondary particle-type positive electrode active material precursor, in which at least a portion of the primary particles are radially arranged, is prepared, and in addition, secondary particles having different internal and external shapes are prepared.

In an embodiment, the positive electrode active material precursor including a nickel-based composite hydroxide is prepared through each first, second, and third step process of forming a core, an intermediate layer, and a shell.

In the first step, a complex agent and a pH controlling agent are put in a reactor, and metal raw materials are added thereto and reacted, the complex agent may have a concentration of 0.1 M to 0.7 M, the input amount of the complex agent may be in a range of 6 mL/min to 12 mL/min, the metal raw materials may have concentrations of 0.1 M to 3.5 M, and the input amounts of the metal raw materials may be in a range of 50 ml/min to 100 ml/min.

In the second step, the metal raw materials and the complex agent are added to a resulting material of the first step reaction to control pH of the reaction mixture, and then, a reaction of the second step is performed, a concentration of the complex agent may be 0.3 M to 1.0 M, the input amount of the complex agent may be in a range of 8 ml/min to 15 ml/min, the metal raw materials may have concentrations of 0.1 M to 3.5 M, and the input amounts of the metal raw materials may be in a range of 90 ml/min to 120 ml/min.

In the third step, the input amounts and the concentrations of the metal raw materials and the complex agent may be increased in order to prevent or mitigate a growth rate decrease of particles after reacting a reaction product from the second step for a set or predetermined time, the concentration of the complex agent may be in a range of 0.35 M to 1.0 M, the input amount of the complex agent may be in a range of 12 ml/min to 20 ml/min, the metal raw materials may have concentrations of 0.1 M to 3.5 M, and the input amounts of the metal raw materials may be in a range of 120 ml/min to 150 ml/min.

In the first step, the second step, and the third step, the pH of the reaction mixture may be adjusted in a range of 10 to 12.

The nickel-based composite hydroxide may be, for example, represented by Chemical Formula 11.

$$Ni_{x11}M^{11}{}_{y11}M^{12}{}_{1-x11-y11}(OH)_2 \qquad \text{Chemical Formula 11}$$

In Chemical Formula 11, $0.3 \leq x11 \leq 1$, $0 \leq y11 \leq 0.7$, and $M^{11}$ and $M^{12}$ are each independently at least one element selected from Al, B, Ba, Ca, Ce, Co, Cr, F, Fe, Mg, Mn, Mo, Nb, P, S, Si, Sr, Ti, V, W, Zr, and a combination thereof.

As an example, the nickel-based composite hydroxide may be represented by Chemical Formula 12 or Chemical Formula 13.

$$Ni_{x12}Co_{y12}M^{13}{}_{1-x12-y12}(OH)_2 \qquad \text{Chemical Formula 12}$$

In Chemical Formula 12, $0.3 \leq x12 < 1$, $0 < y12 \leq 0.7$, and $M^{13}$ is at least one element selected from Al, B, Ba, Ca, Ce, Cr, F, Fe, Mg, Mn, Mo, Nb, P, S, Si, Sr, Ti, V, W, Zr, and a combination thereof.

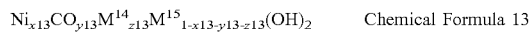

$$Ni_{x13}Co_{y13}M^{14}{}_{z13}M^{15}{}_{1-x13-y13-z13}(OH)_2 \qquad \text{Chemical Formula 13}$$

In Chemical Formula 13, $0.3 \leq x13 \leq 0.98$, $0.01 \leq y13 \leq 0.69$, $0.01 \leq z13 \leq 0.69$, $M^{14}$ is selected from Al, Mn, and a combination thereof, and $M^{15}$ is at least one element selected from B, Ba, Ca, Ce, Cr, F, Fe, Mg, Mo, Nb, P, S, Si, Sr, Ti, V, W, Zr, and a combination thereof.

The average particle diameter (D50) of the positive electrode active material precursor may be, for example, about 7 μm to about 25 μm, or about 8 μm to about 20 μm. Here, the particle size of the positive electrode active material precursor may be measured by an electron microscopic image such as a scanning electron microscope. The average particle size may be obtained by measuring about 50 particle sizes with an electron microscope to obtain a particle size distribution, and the D50 value, which is the particle size at a point where the cumulative volume is about 50 volume %, may be taken as the average particle size.

The aforementioned positive electrode active material may be obtained by mixing the lithium raw material together with the prepared positive electrode active material precursor and then performing heat-treatment.

The lithium raw material may be, for example, Li$_2$CO$_3$, LiOH, a hydrate thereof, or a combination thereof, and may be mixed together in a ratio of about 0.8 mol to about 1.8 mol, or about 0.9 mol to about 1.2 mol with respect to 1 mol of the nickel-based composite hydroxide.

The heat-treatment may be performed, for example, at about 600° C. to about 900° C. or about 600° C. to about 800° C.

In an embodiment, the heat-treatment may include a temperature-raising process and a temperature-maintaining process (e.g., a ramp and soak process), wherein the temperature-raising time (e.g., the ramp time) may be longer than the temperature-maintaining time (e.g., the soak time). For example, the temperature-raising time may be about 6 hours to about 16 hours, and the temperature-maintaining time may be about 1 hour to about 9 hours, wherein the temperature-raising time may be longer than the temperature-maintaining time.

In the heat-treatment, the temperature-raising time may be, for example, about 6 hours to about 15 hours, about 6 hours to about 14 hours, about 6 hours to about 13 hours, or about 7 hours to about 12 hours, and the temperature-maintaining time may be about 2 hours to about 9 hours or about 3 hours to about 8 hours.

In addition, a ratio of (temperature-raising time):(temperature-maintaining time) may be about 1.1:1 to about 10:1, for example, about 1.1:1 to about 8:1, about 1.1:1 to about 6:1, about 1.1:1 to about 5:1, or about 1.1:1 to about 4:1.

In this way, the heat-treatment profile is adjusted to effectively prepare a positive electrode active material in which the aspect ratio and/or cross-sectional area of the primary particles are designed as described above in the inner-outer portions of the secondary particles.

Positive Electrode

The positive electrode for a rechargeable lithium battery may include a current collector and a positive electrode active material layer on the current collector. The positive electrode active material layer may include a positive electrode active material, and may further include a binder and/or a conductive material (e.g., an electrically conductive material).

The binder improves binding properties of positive electrode active material particles with one another and with a current collector. Examples thereof may include polyvinyl alcohol, carboxylmethyl cellulose, hydroxypropyl cellulose, diacetyl cellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, a styrene-butadiene rubber, an acrylated styrene-butadiene rubber, an epoxy resin, nylon, and the like, but are not limited thereto.

The content of the binder in the positive electrode active material layer may be about 1 wt % to about 5 wt % based on the total weight of the positive electrode active material layer.

The conductive material is included to provide electrode conductivity (e.g., electrical conductivity). Any suitable electrically conductive material may be used as a conductive material unless it causes a chemical change (e.g., an undesirable or unsuitable change in the rechargeable lithium battery). Examples of the conductive material may include a carbon-based material such as natural graphite, artificial graphite, carbon black, acetylene black, ketjen black, a carbon fiber, carbon nanotube, and the like; a metal-based material of a metal powder and/or a metal fiber including copper, nickel, aluminum, silver, and the like; a conductive polymer such as a polyphenylene derivative; or a mixture thereof.

The content of the conductive material in the positive electrode active material layer may be about 1 wt % to about 5 wt % based on the total weight of the positive electrode active material layer.

An aluminum foil may be used as the positive electrode current collector, but the present disclosure is not limited thereto.

Negative Electrode

The negative electrode for a rechargeable lithium battery includes a current collector and a negative electrode active material layer on the current collector. The negative electrode active material layer includes a negative electrode active material and may further include a binder and/or a conductive material (e.g., an electrically conductive material).

The negative electrode active material may include a material that reversibly intercalates/deintercalates lithium ions, a lithium metal, a lithium metal alloy, a material capable of doping/dedoping lithium, and/or transition metal oxide.

The material that reversibly intercalates/deintercalates lithium ions may include, for example crystalline carbon, amorphous carbon, or a combination thereof as a carbon-based negative electrode active material. The crystalline carbon may be non-shaped, and/or sheet, flake, spherical, and/or fiber shaped natural graphite and/or artificial graphite. The amorphous carbon may be a soft carbon, a hard carbon, a mesophase pitch carbonization product, calcined coke, and/or the like.

The lithium metal alloy includes an alloy of lithium and a metal selected from Na, K, Rb, Cs, Fr, Be, Mg, Ca, Sr, Si, Sb, Pb, In, Zn, Ba, Ra, Ge, Al, and Sn.

The material capable of doping/dedoping lithium may be a Si-based negative electrode active material and/or a Sn-based negative electrode active material. The Si-based negative electrode active material may include silicon, a silicon-carbon composite, $SiO_x$ (0<x<2), a Si-Q alloy (wherein Q is an alkali metal, an alkaline-earth metal, a Group 13 element, a Group 14 element, a Group 15 element, a Group 16 element, a transition metal, a rare earth element, and a combination thereof, but not Si) and the Sn-based negative electrode active material may include Sn, $SnO_2$, a Sn—R alloy (wherein R is an alkali metal, an alkaline-earth metal, a Group 13 element, a Group 14 element, a Group 15 element, a Group 16 element, a transition metal, a rare earth element, and a combination thereof, but not Sn). At least one of these materials may be mixed together with $SiO_2$. The elements Q and R may be selected from Mg, Ca, Sr, Ba, Ra, Sc, Y, Ti, Zr, Hf, Rf, V, Nb, Ta, Db, Cr, Mo, W, Sg, Tc, Re, Bh, Fe, Pb, Ru, Os, Hs, Rh, Ir, Pd, Pt, Cu, Ag, Au, Zn, Cd, B, Al, Ga, Sn, In, Tl, Ge, P, As, Sb, Bi, S, Se, Te, Po, and a combination thereof.

The silicon-carbon composite may be, for example, a silicon-carbon composite including a core including crystalline carbon and silicon particles and an amorphous carbon coating layer on the surface of the core. The crystalline carbon may be artificial graphite, natural graphite, or a combination thereof. The amorphous carbon precursor may be a coal-based pitch, mesophase pitch, petroleum-based pitch, coal-based oil, petroleum-based heavy oil, and/or a polymer resin such as a phenol resin, a furan resin, and/or a polyimide resin. In this case, the content of silicon may be about 10 wt % to about 50 wt % based on the total weight of the silicon-carbon composite. In addition, the content of the crystalline carbon may be about 10 wt % to about 70 wt % based on the total weight of the silicon-carbon composite, and the content of the amorphous carbon may be about 20 wt % to about 40 wt % based on the total weight of the silicon-carbon composite. In addition, a thickness of the amorphous carbon coating layer may be about 5 nm to about 100 nm. An average particle diameter (D50) of the silicon particles may be about 10 nm to about 20 μm. The average particle diameter (D50) of the silicon particles may be, for example, about 10 nm to about 200 nm. The silicon particles may exist in an oxidized form, and in this case, an atomic content ratio of Si:O in the silicon particles indicating a degree of oxidation may be about 99:1 to about 33:67. The silicon particles may be $SiO_x$ particles, and in this case, the range of x in $SiO_x$ may be greater than about 0 and less than about 2.

The Si-based negative electrode active material and/or Sn-based negative electrode active material may be mixed together with the carbon-based negative electrode active material. When the Si-based negative electrode active material and/or Sn-based negative electrode active material and the carbon-based negative electrode active material are mixed together and used, the mixing ratio may be a weight ratio of about 1:99 to about 90:10.

In the negative electrode active material layer, the negative electrode active material may be included in an amount of about 95 wt % to about 99 wt % based on the total weight of the negative electrode active material layer.

In an embodiment, the negative electrode active material layer further includes a binder, and may optionally further include a conductive material (e.g., an electrically conductive material). The content of the binder in the negative electrode active material layer may be about 1 wt % to about 5 wt % based on the total weight of the negative electrode active material layer. In addition, when the conductive material is further included, the negative electrode active material layer may include about 90 wt % to about 98 wt % of the negative electrode active material, about 1 wt % to about 5 wt % of the binder, and about 1 wt % to about 5 wt % of the conductive material.

The binder serves to well adhere the negative electrode active material particles to each other and also to adhere the negative electrode active material to the current collector. The binder may be a water-insoluble binder, a water-soluble binder, or a combination thereof.

Examples of the water-insoluble binder include polyvinyl chloride, carboxylated polyvinyl chloride, polyvinyl fluoride, an ethylene oxide-containing polymer, an ethylene propylene copolymer, polystyrene, polyvinylpyrrolidone, polyurethane, polytetrafluoro ethylene, polyvinylidene fluoride, polyethylene, polypropylene, polyamideimide, polyimide, or a combination thereof.

The water-soluble binder may include a rubber binder and/or a polymer resin binder. The rubber binder may be selected from a styrene-butadiene rubber, an acrylated styrene-butadiene rubber, an acrylonitrile-butadiene rubber, an acrylic rubber, a butyl rubber, a fluororubber, and a combination thereof. The polymer resin binder may be selected from polyethylene oxide, polyvinylpyrrolidone, polyepichlorohydrin, polyphosphazene, polyacrylonitrile, an ethylene propylene diene copolymer, polyvinylpyridine, chlorosulfonated polyethylene, latex, a polyester resin, an acrylic resin, a phenol resin, an epoxy resin, polyvinyl alcohol, and a combination thereof.

When a water-soluble binder is used as the negative electrode binder, a cellulose-based compound capable of imparting (e.g., increasing) viscosity may be further included. As the cellulose-based compound, one or more of carboxymethyl cellulose, hydroxypropylmethyl cellulose, methyl cellulose, and/or alkali metal salts thereof may be mixed together and used. As the alkali metal, Na, K or Li may be used. The amount of the thickener used may be about 0.1 parts by weight to about 3 parts by weight based on 100 parts by weight of the negative electrode active material.

The conductive material is included to provide electrode conductivity (e.g., electrical conductivity). Any suitable electrically conductive material may be used as a conductive material unless it causes a chemical change (e.g., an undesirable or unsuitable change in the rechargeable lithium battery). Examples of the conductive material include a carbon-based material such as natural graphite, artificial graphite, carbon black, acetylene black, ketjen black, a carbon fiber, carbon nanotube, and the like; a metal-based material of a metal powder and/or a metal fiber including copper, nickel, aluminum silver, and the like; a conductive polymer such as a polyphenylene derivative; or a mixture thereof.

The negative electrode current collector may include one selected from a copper foil, a nickel foil, a stainless steel foil, a titanium foil, a nickel foam, a copper foam, a polymer substrate coated with a conductive metal, and a combination thereof.

Rechargeable Lithium Battery

Another embodiment provides a rechargeable lithium battery including a positive electrode, a negative electrode, and an electrolyte.

The rechargeable lithium battery may include, for example, a positive electrode, a negative electrode, a separator between the positive electrode and the negative electrode, and an electrolyte, wherein the electrolyte may be in the form of a liquid or a gel polymer. As another example, the rechargeable lithium battery may be an all-solid-state battery including a positive electrode, a negative electrode, and a solid electrolyte, or a semi-solid battery including a positive electrode, a negative electrode, and a semi-solid electrolyte. The term "semi-solid," as used herein, may mean a state including both a solid component and a liquid component, or a state in which most of the solid component is included but a portion of the liquid component is included. The all-solid-state battery and the semi-solid battery may not include a separator. The positive electrode active material according to an embodiment can realize very high charge/discharge efficiency and high temperature cycle-life while realizing a high capacity due to its shape, so it is suitable for application to the aforementioned types (or kinds) of batteries and exhibits excellent performance in each battery.

Figure 4:
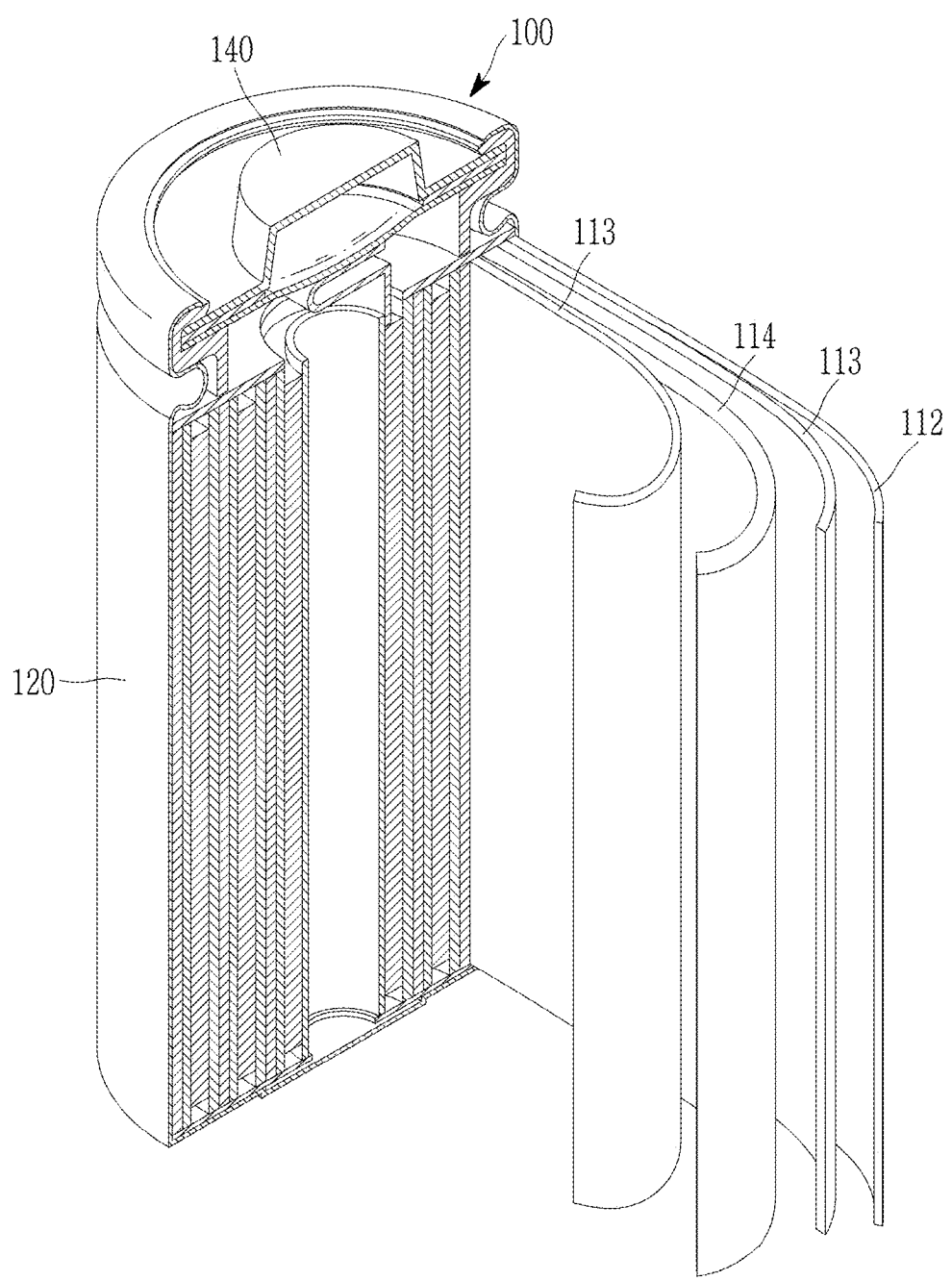
FIG. 4 is a schematic view illustrating a rechargeable lithium battery according to an embodiment.

As an example, a rechargeable lithium battery including a separator and a liquid electrolyte is described. FIG. 4 is a schematic view illustrating a rechargeable lithium battery according to an embodiment. Referring to FIG. 4, the rechargeable lithium battery 100 according to an embodiment includes a battery cell including a positive electrode 114, a negative electrode 112 facing the positive electrode 114, a separator 113 between the positive electrode 114 and the negative electrode 112, an electrolyte for a rechargeable lithium battery impregnating the positive electrode 114, negative electrode 112, and separator 113, a battery case 120 containing the battery cell, and a sealing member 140 sealing the battery case 120.

The electrolyte includes a non-aqueous organic solvent and a lithium salt.

The non-aqueous organic solvent serves as a medium for transmitting ions taking part in the electrochemical reaction of a battery. The non-aqueous organic solvent may include a carbonate-based, ester-based, ether-based, ketone-based, alcohol-based, and/or aprotic solvent. The carbonate-based solvent may include dimethyl carbonate (DMC), diethyl carbonate (DEC), dipropyl carbonate (DPC), methylpropyl carbonate (MPC), ethylpropyl carbonate (EPC), methylethyl carbonate (MEC), ethylene carbonate (EC), propylene carbonate (PC), butylene carbonate (BC), and/or the like. The ester-based solvent may include methyl acetate, ethyl acetate, n-propyl acetate, dimethylacetate, methylpropionate, ethylpropionate, γ-butyrolactone, decanolide, valerolactone, mevalonolactone, caprolactone, and/or the like. The ether-based solvent may include dibutyl ether, tetraglyme, diglyme, dimethoxyethane, 2-methyltetrahydrofuran, tetrahydrofuran, and/or the like and the ketone-based solvent may include cyclohexanone, and/or the like. In addition, the alcohol-based solvent may include ethanol, isopropyl alcohol, and/or the like and the aprotic solvent may include nitriles such as R—CN (wherein, R is a C2 to C20 linear, branched, or cyclic hydrocarbon group, and may include a double bond, an aromatic ring, and/or an ether bond), and the like, amides such as dimethyl formamide, and/or the like, dioxolanes such as 1,3-dioxolane, sulfolanes, and/or the like.

The non-aqueous organic solvent may be used alone or in a mixture. When the organic solvent is used in a mixture, the mixture ratio may be controlled in accordance with a suitable or desirable battery performance.

In addition, the carbonate-based solvent may include a mixture of a cyclic carbonate and a chain carbonate. In this case, when the cyclic carbonate and the chain carbonate are mixed together in a volume ratio of about 1:1 to about 1:9, the electrolyte may exhibit excellent performance.

The non-aqueous organic solvent may further include an aromatic hydrocarbon-based organic solvent in the carbonate-based solvent. In this case, the carbonate-based solvent and the aromatic hydrocarbon-based organic solvent may be mixed together in a volume ratio of about 1:1 to about 30:1.

As the aromatic hydrocarbon-based solvent, an aromatic hydrocarbon-based compound represented by Chemical Formula I may be used.

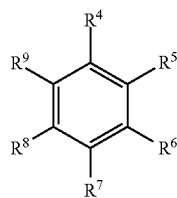

Chemical Formula I

In Chemical Formula I, $R^4$ to $R^9$ are the same or different and are selected from hydrogen, a halogen, a C1 to C10 alkyl group, a C1 to C10 haloalkyl group, and a combination thereof.

Examples of the aromatic hydrocarbon-based solvent may be selected from benzene, fluorobenzene, 1,2-difluorobenzene, 1,3-difluorobenzene, 1,4-difluorobenzene, 1,2,3-trifluorobenzene, 1,2,4-trifluorobenzene, chlorobenzene, 1,2-dichlorobenzene, 1,3-dichlorobenzene, 1,4-dichlorobenzene, 1,2,3-trichlorobenzene, 1,2,4-tichlorobenzene, iodobenzene, 1,2-diiodobenzene, 1,3-diiodobenzene, 1,4-diiodobenzene, 1,2,3-triiodobenzene, 1,2,4-triiodobenzene, toluene, fluorotoluene, 2,3-difluorotoluene, 2,4-difluorotoluene, 2,5-difluorotoluene, 2,3,4-trifluorotoluene, 2,3,5-trifluorotoluene, chlorotoluene, 2,3-dichlorotoluene, 2,4-dichlorotoluene, 2,5-dichlorotoluene, 2,3,4-trichlorotoluene, 2,3,5-trchlorotoluene, iodotoluene, 2,3-diiodotoluene, 2,4-diiodotoluene, 2,5-diiodotoluene, 2,3,4-triiodotoluene, 2,3,5-triiodotoluene, xylene, and a combination thereof.

The electrolyte may further include vinylene carbonate and/or an ethylene carbonate-based compound of Chemical Formula II in order to improve cycle-life of a battery.

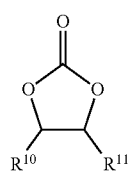

Chemical Formula II

In Chemical Formula II, $R^{10}$ and $R^{11}$ are the same or different, and are selected from hydrogen, a halogen, a cyano group, a nitro group, and fluorinated C1 to C5 alkyl group, provided that at least one of $R^{10}$ and $R^{11}$ is selected from a halogen, a cyano group, a nitro group, and fluorinated C1 to C5 alkyl group, but both of $R^{10}$ and $R^{11}$ are not hydrogen.

Examples of the ethylene carbonate-based compound may include difluoro ethylenecarbonate, chloroethylene carbonate, dichloroethylene carbonate, bromoethylene carbonate, dibromoethylene carbonate, nitroethylene carbonate, cyanoethylene carbonate, and/or fluoroethylene carbonate. The amount of the additive for improving cycle-life may be used within a suitable or appropriate range.

The lithium salt dissolved in the non-aqueous organic solvent supplies lithium ions in a battery, enables a basic operation of a rechargeable lithium battery, and improves transportation of the lithium ions between positive and negative electrodes.

Examples of the lithium salt include at least one supporting salt selected from $LiPF_6$, $LiBF_4$, $LiSbF_6$, $LiAsF_6$, $LiN(SO_2C_2F_5)_2$, $Li(CF_3SO_2)_2N$, $LiN(SO_3C_2F_5)_2$, $Li(FSO_2)_2N$ (lithium bis(fluorosulfonyl)imide: LiFSI), $LiC_4F_9SO_3$, $LiClO_4$, $LiAlO_2$, $LiAlCl_4$, $LiPO_2F_2$, $LiN(C_xF_{2x+1}SO_2)(C_yF_{2y+1}SO_2)$ (wherein x and y are natural numbers, for example, an integer ranging from 1 to 20), lithium difluoro (bisoxalato) phosphate, LiCl, LiI, $LiB(C_2O_4)_2$ (lithium bis (oxalato) borate, LiBOB), and lithium difluoro(oxalato) borate (LiDFOB).

The lithium salt may be used in a concentration in a range from about 0.1 M to about 2.0 M. When the lithium salt is included at the above concentration range, an electrolyte may have excellent performance and lithium ion mobility due to suitable or optimal electrolyte conductivity and viscosity.

The separator 113 separates a positive electrode 114 and a negative electrode 112 and provides a transporting passage for lithium ions and may be any suitable, generally-used separator in a lithium ion battery. In some embodiments, the separator may have low resistance to ion transport and excellent impregnation for an electrolyte. For example, the separator 113 may include glass fiber, polyester, polyethylene, polypropylene, polytetrafluoroethylene, or a combination thereof, and may be in the form of a non-woven fabric and/or a woven fabric. For example, in a lithium ion battery, a polyolefin-based polymer separator such as polyethylene and/or polypropylene may be mainly used. In order to ensure the heat resistance and/or mechanical strength, a coated separator including a ceramic component and/or a polymer material may be used. Optionally, it may have a mono-layered or multi-layered structure.

Rechargeable lithium batteries may be classified as lithium ion batteries, lithium ion polymer batteries, or lithium polymer batteries according to the presence of a separator and the kind of electrolyte used therein. The rechargeable lithium batteries may have a variety of shapes and sizes, and include cylindrical, prismatic, coin, or pouch-type batteries, and may be thin film batteries or may be rather bulky in size. Any suitable structures and manufacturing methods generally used in the art for lithium ion batteries may be used for the subject matter of the present disclosure.

The rechargeable lithium battery according to an embodiment may be used in an electric vehicle (EV), a hybrid electric vehicle such as a plug-in hybrid electric vehicle (PHEV), and portable electronic device because it implements a high capacity and has excellent storage stability, cycle-life characteristics, and high rate characteristics at high temperatures.

Hereinafter, examples of the present disclosure and comparative examples are described. It is to be understood, however, that the examples are for the purpose of illustration and are not to be construed as limiting the present disclosure.

Comparative Example 1

1. Preparation of Positive Electrode Active Material Precursor

Nickel sulfate, cobalt sulfate, and aluminum nitrate were dissolved in distilled water at a mole ratio of 94.5:4:1.5 to prepare a metal raw material mixed solution. A dilute ammonia water ($NH_4OH$) solution and sodium hydroxide (NaOH) as a precipitant were prepared to form a complex compound.

After adding the dilute ammonia water solution to the continuous reactor, the metal raw material mixed solution was continuously added, and sodium hydroxide was added to maintain the pH inside the reactor. The reaction proceeded slowly for about 80 hours, and when the reaction was stabilized, the product that overflowed was collected and the drying process proceeded.

Accordingly, a nickel-based composite hydroxide ($Ni_{0.945}Co_{0.04}Al_{0.015}(OH)_2$) in a form of a secondary particle in which primary particles are not radially arranged was prepared.

2. Preparation of Positive Electrode Active Material 100 parts by mole of LiOH was mixed together with 100 parts by moles of the obtained nickel-based composite hydroxide, a temperature was raised to 730° C. for 5 hours in an oxygen atmosphere, and heat-treatment was performed for 7 hours to prepare a non-radial nickel-based composite oxide, $LiNi_{0.945}Co_{0.04}Al_{0.015}O_2$, which is a positive electrode active material.

3. Manufacture of Positive Electrode 96 wt % of the obtained positive electrode active material, 2 wt % of polyvinylidene fluoride, 2 wt % of carbon nanotube, and N-methylpyrrolidone as a solvent were mixed together in a mixer to prepare a slurry for a positive electrode active material layer. The slurry for the positive electrode active material layer was coated on an aluminum foil into an electrode plate and then, dried at 135° C. for at least 3 hours, roll-pressed, and vacuum-dried, manufacturing a positive electrode.

4. Manufacture of Battery Cell

The positive electrode and a lithium metal counter electrode were used to manufacture a coin half-cell. Between the positive electrode and the lithium metal counter electrode, a separator formed of a porous polyethylene film (thickness: about 16 μm) was interposed, and an electrolyte solution was injected thereinto. The electrolyte solution was prepared by mixing together ethylenecarbonate (EC) and ethylmethylcarbonate (EMC) in a volume ratio of 3:5 and dissolving 1.1 M $LiPF_6$ in the mixed solvent.

Comparative Example 2

1. Preparation of Positive Electrode Active Material Precursor

In the following co-precipitation method, nickel sulfate, cobalt sulfate, and aluminum nitrate were used as metal raw materials.

First Step: 2.5 kW/m³, $NH_4OH$ 0.40 M, pH 10.5 to 11.5, and Reaction Time of 6 Hours First, ammonia water having a concentration of 0.40 M was put in a reactor. While metal raw materials and a complexing agent ($NH_4OH$) were added thereto respectively at 85 ml/min and 10 ml/min at 50° C. under a stirring power of 2.5 kW/m³, a reaction was started.

While NaOH was added thereto to maintain pH, the reaction was performed for 6 hours. As a result of the reaction, it was confirmed that the average sizes of the obtained core particles were in the range of about 6.5 μm to 7.5 μm, and the second step was performed as follows.

Second Step: 2.0 kW/m³, $NH_4OH$ 0.45 M, pH 10.5 to 11.5, and Reaction Time of 18 Hours The metal raw materials and the complexing agent were added thereto respectively at 107 ml/min and 15 ml/min, while the reaction temperature was maintained at 50° C., so that a concentration of the complexing agent was maintained to be 0.45 M. While adding NaOH thereto in order to maintain pH, the reaction was performed for 18 hours. At this time, the stirring power was lowered to 2.0 kW/m³, which was lower than the first step, and the reaction proceeded. By performing this reaction, it was confirmed that the average sizes of the product particles containing the core and the intermediate layer were 11.5 μm to 12 μm, and the third step was performed as follows.

Third Step: 1.0 kW/m³, $NH_4OH$ 0.45 M, pH 10.5-11.5, and Reaction Time of 10 Hours While maintaining the reaction temperature of 50° C., the metal raw material and the complexing agent were added at the rates of 142 ml/min and 19 ml/min, respectively, so that the concentration of the complexing agent was maintained the same as in the second step. While adding NaOH thereto in order to maintain pH, the reaction was performed for 10 hours. At this time, the stirring power was lowered to 1.0 kW/m³, which was lower than in the second step, and the reaction proceeded.

Post-Process

After washing the resultant, the washed resultant was dried with hot air at about 150° C. for 24 hours to obtain nickel-based hydroxide ($Ni_{0.945}Co_{0.04}Al_{0.015}(OH)_2$), which was a positive electrode active material precursor.

2. Preparation of Positive Electrode Active Material 100 parts by mole of LiOH was mixed together with 100 parts by moles of the obtained nickel-based composite hydroxide, a temperature was raised to 700° C. for 5 hours in an oxygen atmosphere, and heat-treatment was performed for 10 hours to prepare a final positive electrode active material, a nickel-based composite oxide ($LiNi_{0.945}Co_{0.04}Al_{0.015}O_2$).

Thereafter, a positive electrode and a battery cell were manufactured in substantially the same manner as in Comparative Example 1.

Example 1

In Example 1, a positive electrode active material, a positive electrode, and a battery cell were prepared according to substantially the same method as in Comparative Example 2, except that in the preparation of the positive electrode active material the temperature was raised to 700° C. for 8 hours in an oxygen atmosphere, and heat-treatment was performed for 7 hours.

Example 2

In Example 2, a positive electrode active material, a positive electrode, and a battery cell were prepared according to substantially the same method as in Comparative Example 2, except that in the preparation of the positive electrode active material the temperature was raised to 700° C. for 11 hours in an oxygen atmosphere, and heat-treatment was performed for 4 hours.

Figure 5:
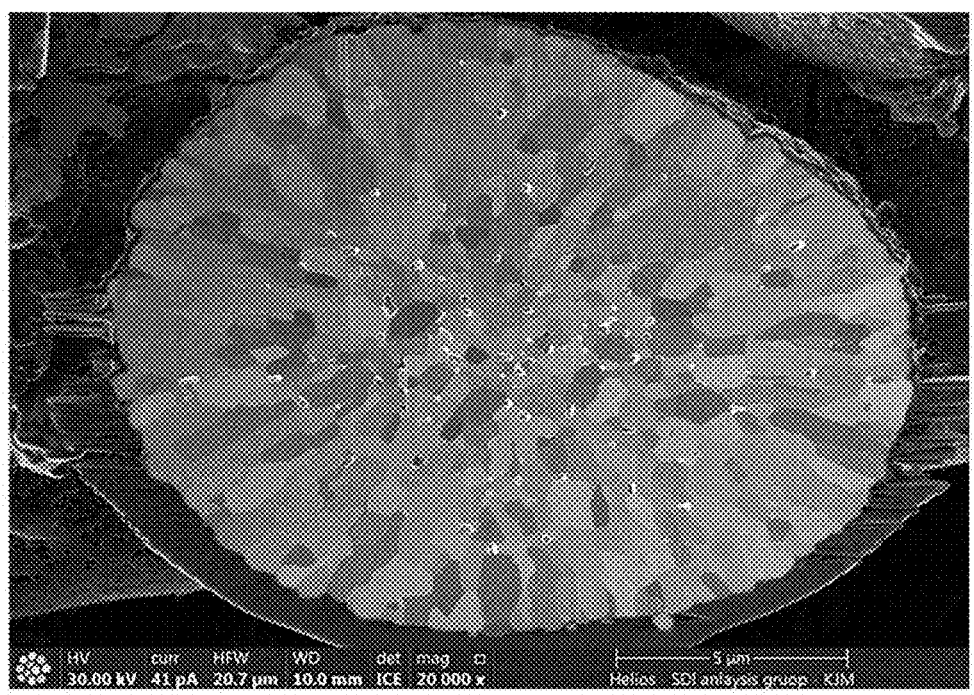
FIG. 5 is a scanning electron microscope (SEM) image of a cross-section of the positive electrode active material prepared in Comparative Example 1.

Evaluation Example 1: Analysis of Cross-Section of Positive Electrode Active Material FIG. 5 is an SEM image of a cross-section of the positive electrode active material prepared in Comparative Example 1 which was cut with FIB. Referring to FIG. 5, in the positive electrode active material of Comparative Example 1, the primary particles are not radially arranged and have a relatively large size and a relatively small aspect ratio.

Figure 6:
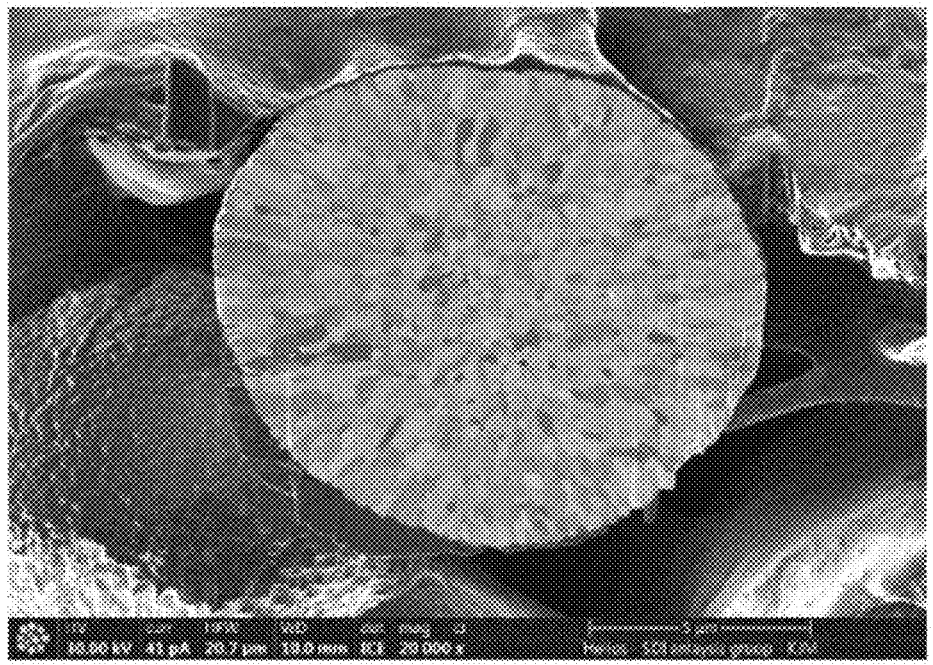
FIG. 6 is a scanning electron microscope (SEM) image of a cross-section of the positive electrode active material prepared in Comparative Example 2.
Figure 7:
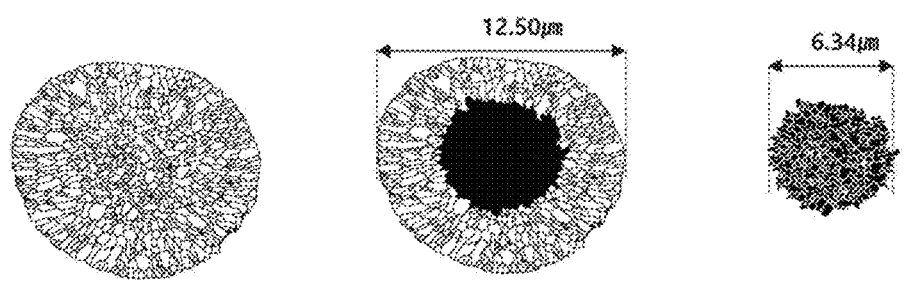
FIG. 7 is an image in which primary particles are contour-processed with respect to the cross-section of the positive electrode active material prepared in Comparative Example 2, and is a view in which the outer portion and inner portion are separated.

FIG. 6 is a SEM image of a cross-section of the positive electrode active material prepared in Comparative Example 2 which was cut with FIB, and FIG. 7 is an image obtained by contour-processing the primary particles of FIG. 6. FIG. 7 is a contour image of the primary particles on the entire cross-section of the secondary particle of the positive electrode active material, in an outer portion the cross-section of the secondary particle, and in the inner portion of the cross-section of the secondary particle, in order from the left. Referring to FIGS. 6 and 7, in the positive electrode active material of Comparative Example 2 into which a precursor preparation method differing from Comparative Example 1 was introduced, a portion of the primary particles is radially arranged in the outer portion, but a pore layer was not developed.

Figure 8:
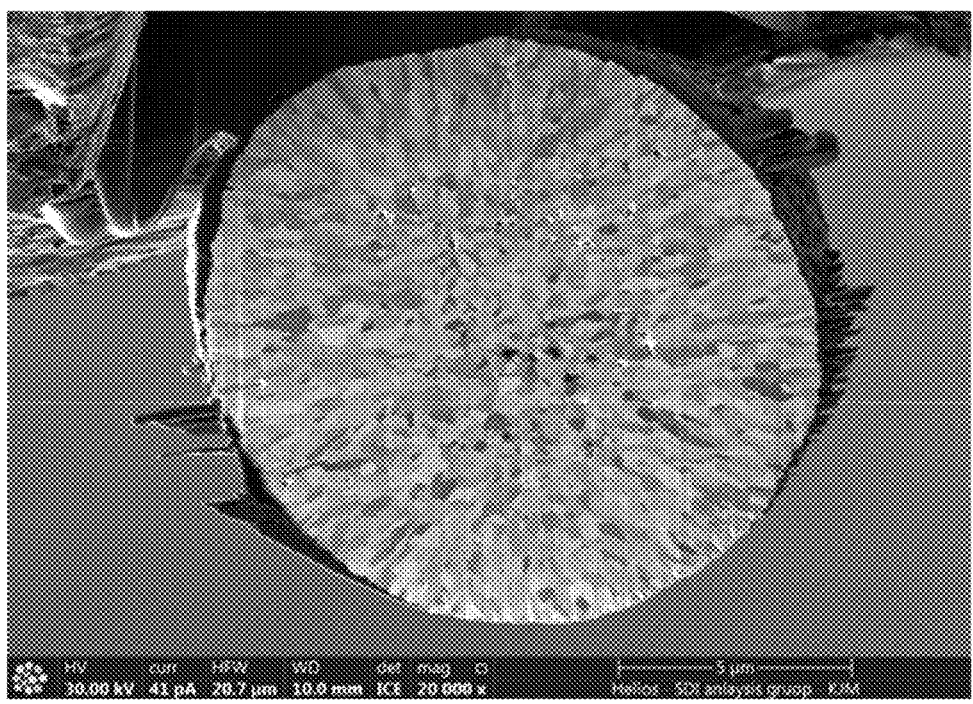
FIG. 8 is a scanning electron microscope (SEM) image of a cross-section of the positive electrode active material prepared in Example 1.
Figure 9:
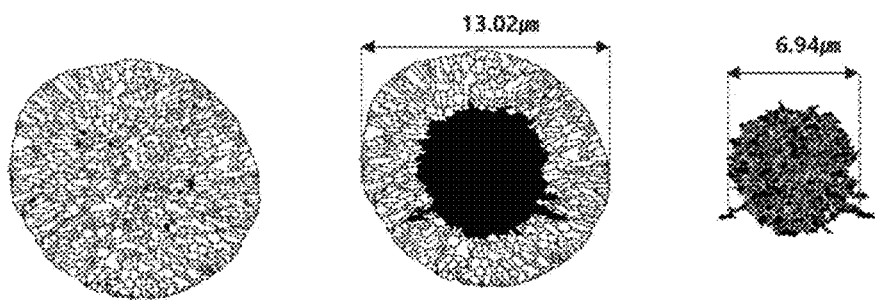
FIG. 9 is an image in which primary particles are contour-processed with respect to the cross-section of the positive electrode active material prepared in Example 1, and is a view in which the outer portion and inner portion are separated.

FIG. 8 is an SEM image of a cross-section of the positive electrode active material according to Example 1 which was cut with FIB, and FIG. 9 is an image obtained by contouring the primary particles in FIG. 8. Similarly, FIG. 9 is a contour image of primary particles for the entire cross-section of a secondary particle and the outer portion of the secondary particle cross-section, and the inner portion of the secondary particle cross-section in order from the left. Referring to FIGS. 8 and 9, the positive electrode active material secondary particle of Example 1 was confirmed to have an inner portion having an irregular porous structure and an outer portion where the primary particles are radially arranged. Herein, the inner and outer portions are distinguished by a boundary of 6.51 μm, which is 50 length % of a total diameter of the secondary particle, and as a result of including the primary particles at the boundary of 50 length % into the inner portion, the secondary particle has a total diameter of 13.02 μm, and the inner portion has a diameter of 6.94 μm. A ratio of an inner radius to a secondary particle radius was calculated to be 53.3%, and a ratio of a volume of the outer portion to a total volume of the secondary particle was calculated to be 84.9%.

Figure 10:
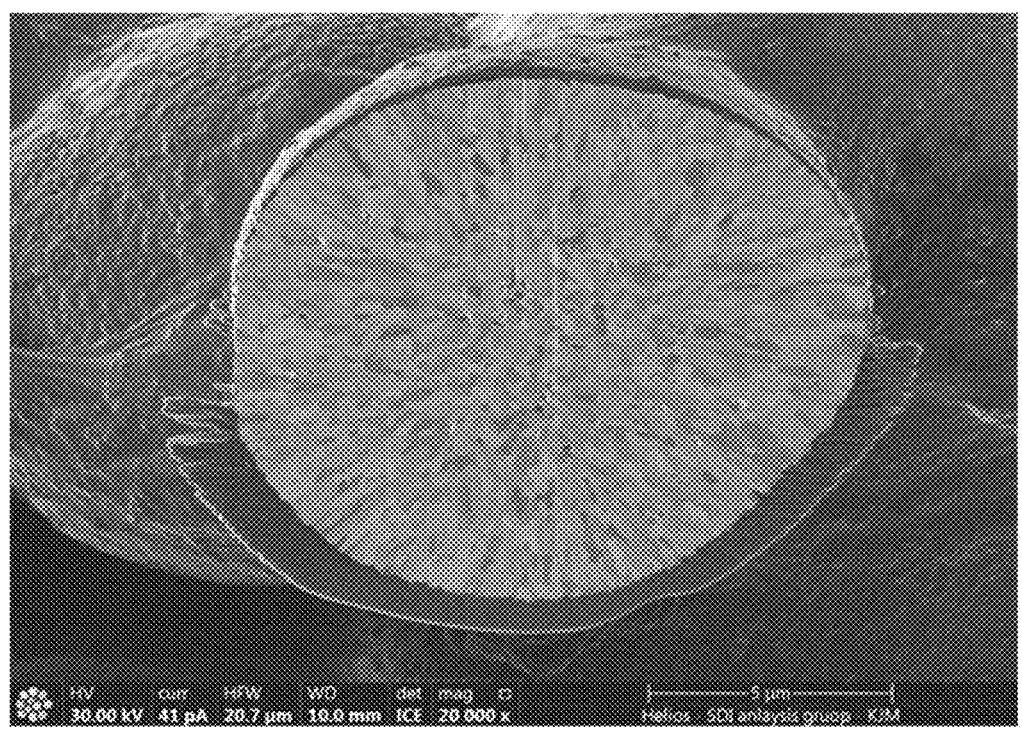
FIG. 10 is a scanning electron microscope (SEM) image of a cross-section of the positive electrode active material prepared in Example 2.
Figure 11:
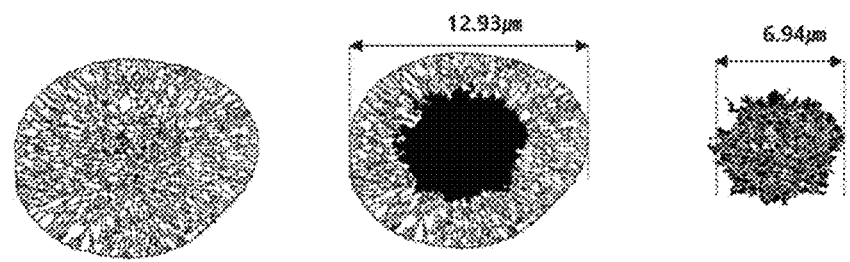
FIG. 11 is an image in which primary particles are contour-processed with respect to the cross-section of the positive electrode active material prepared in Example 2, and is a view in which the outer portion and inner portion are separated.

FIG. 10 is an SEM image of a cross-section of the positive electrode active material prepared in Example 2 which was cut with FIB, and FIG. 11 is an image obtained by contour-processing the primary particles in FIG. 10. Similarly, FIG. 11 is a contour image of the primary particles for the entire cross-section of the secondary particle of the positive electrode active material, an outer portion of the secondary particle cross-section, and an inner portion of the secondary particle cross-section in order from the left. Referring to FIGS. 10 and 11, the positive electrode active material secondary particle of Example 2 consisted of an inner portion having a porous structure and an outer portion where the primary particles are radially arranged. Herein, the inner and outer portions are distinguished by a boundary of 6.47 μm, which is 50 length % of a total diameter of the secondary particle, and as a result of including primary particles at the boundary of 50 length % into the inner portion, the total diameter of the secondary particle is 12.93 μm, and the inner portion has a diameter of 6.94 μm. A ratio of an inner radius to a secondary particle radius was calculated to be 53.7%, and a ratio of a volume of the outer portion to a total volume of the secondary particle was calculated to be 84.5%.

Evaluation Example 2: Aspect Ratio Distribution Analysis of Primary Particles

Figure 12:
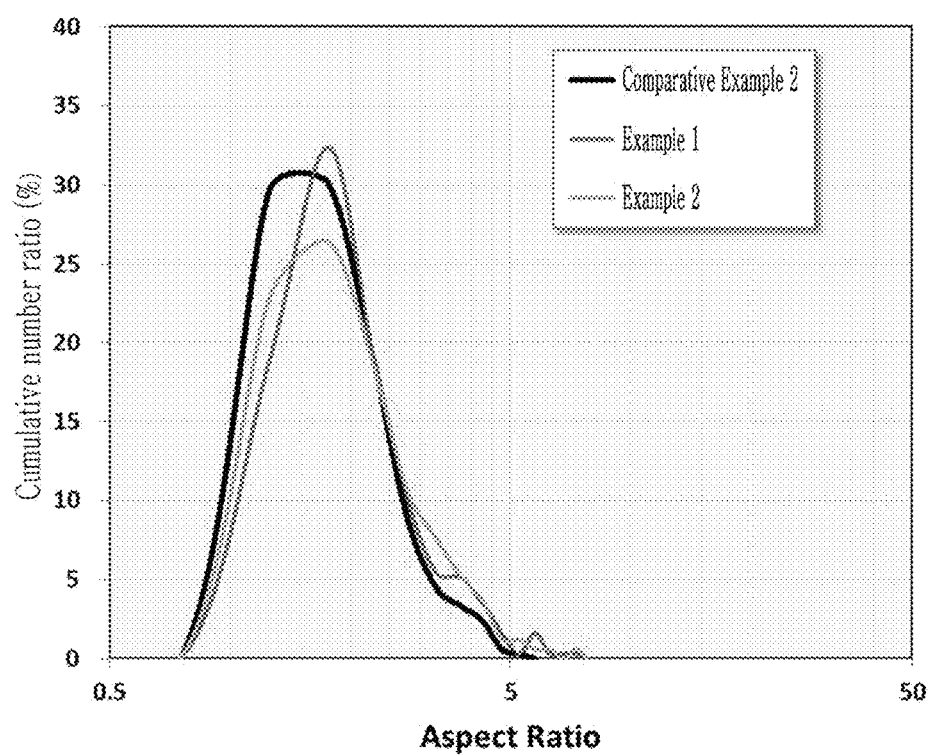
FIG. 12 is a graph showing aspect ratio distributions of primary particles in the inner portion in the cross-section of the secondary particles of the positive electrode active materials of Comparative Example 2, Example 1, and Example 2.
Figure 13:
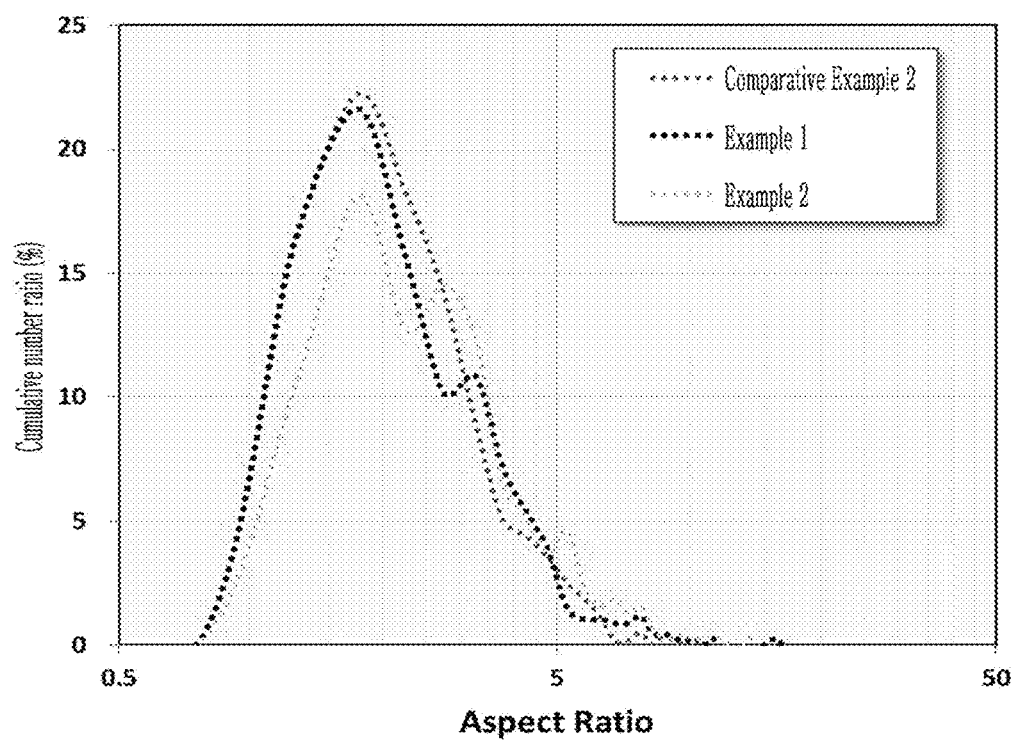
FIG. 13 is a graph showing aspect ratio distributions of primary particles in the outer portion in the cross-section of the secondary particles of the positive electrode active material of Comparative Example 2, Example 1, and Example 2.

An image analysis program (Image J) was used to analyze an aspect ratio distribution of the primary particles in the contoured images of FIGS. 7, 9, and 11. FIG. 12 is a graph showing an aspect ratio distribution of the primary particles of the "inner portion" in the cross-section of each secondary particle of the positive electrode active materials of Comparative Example 2 and Examples 1 and 2. FIG. 13 is a graph showing an aspect ratio distribution of the primary particles of the "outer portion" in the cross-section of each secondary particle of the positive electrode active materials of Comparative Example 2 and Examples 1 and 2. In FIGS. 12 and 13, a horizontal axis represents an aspect ratio of the primary particles, and a vertical axis represents a cumulative number ratio.

Figure 14:
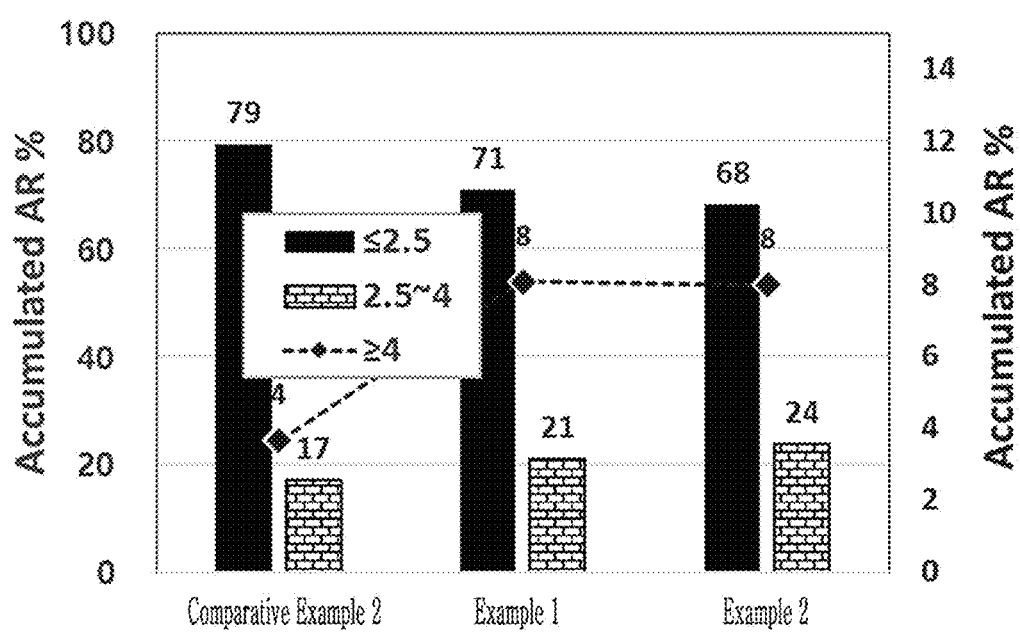
FIG. 14 is a graph showing number ratios according to the aspect ratio ranges as analyzed through the aspect ratio distribution curves in the inner portions of the secondary particles of FIG. 12.

FIG. 14 is a graph showing number ratios according to the aspect ratio ranges as analyzed through an aspect ratio distribution of the primary particles in the inner portion of the secondary particle of FIG. 12, wherein a dotted line graph represents the number ratio of the primary particles having an aspect ratio of greater than or equal to about 4 in the inner portion of the secondary particle, a brick-shaped bar graph represents the number ratio of the primary particles having an aspect ratio of greater than 2.5 and less than 4, and a black bar graph represents the number ratio of the primary particles having an aspect ratio of less than or equal to about 2.5. The dotted line graph corresponds to a right vertical axis, and the bar graphs correspond to a left vertical axis.

Figure 15:
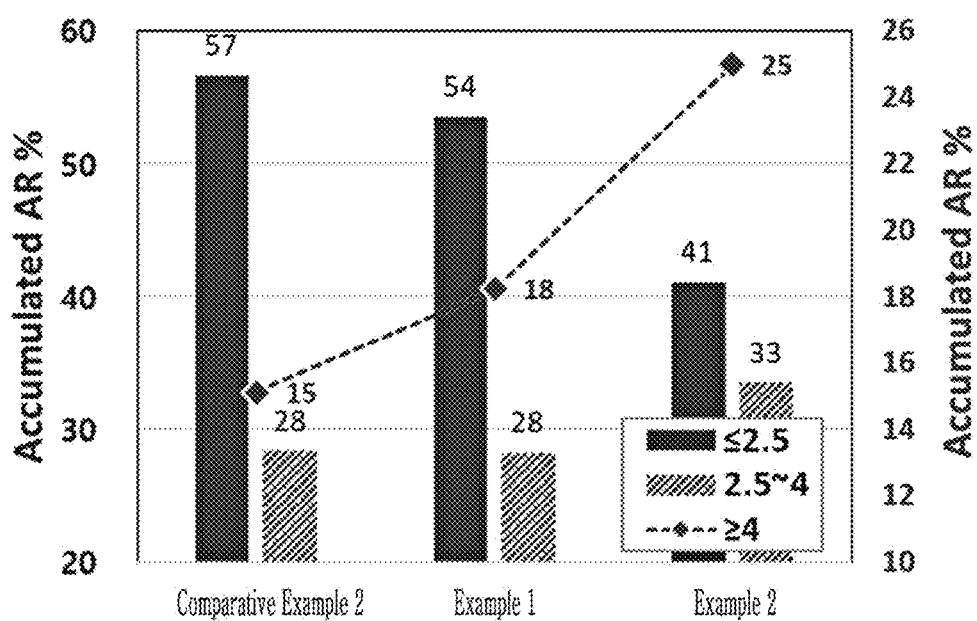
FIG. 15 is a graph showing number ratios according to the aspect ratio ranges as analyzed through the aspect ratio distribution curves in the outer portions of the secondary particles of FIG. 13.

FIG. 15 is a graph showing number ratios according to the aspect ratio ranges as analyzed through the curves of aspect ratio distribution in the "outer portion" of the secondary particle of FIG. 13, wherein a dotted line graph represents the number ratio of the primary particles having an aspect ratio of greater than or equal to about 4 in the outer portion of the secondary particle, a hatched bar graph represents the number ratio of the primary particles having an aspect ratio of greater than 2.5 and less than 4, and a black bar graph represents the number ratio of the primary particles having an aspect ratio of less than or equal to about 2.5. The dotted line graph corresponds to a right vertical axis, and the bar graphs correspond to a left vertical axis.

Referring to FIG. 15, comparing the outer portion of Comparative Example 2 in which a portion of the primary particles are radially arranged by introducing a precursor-manufacturing method differing from Comparative Example 1 with the outer portions of Examples 1 and 2, the number ratio of the primary particles having an aspect ratio of greater than or equal to 4 in the outer portion of a secondary particle was 15% in Comparative Example 2 (dotted line graph) but 18% in Example 1 and 25% in Example 2, which are much higher by greater than or equal to 18% than Comparative Example 2. In addition, the number ratio of the primary particles having an aspect ratio of less than or equal to about 2.5 (black bar graph) in the outer portion of secondary particle was 57% in Comparative Example 2 but 54% in Example 1 and 41% in Example 2, which are lower than that of Comparative Example 2.

Through this, the examples exhibit a high ratio of primary particles having a large aspect ratio in the outer portion of a secondary particle but a low ratio of primary particles having a small aspect ratio, compared with Comparative Example 2. For example, the examples satisfy greater than or equal to 18% of a ratio of primary particles having an aspect ratio of greater than or equal to 4 in the outer portion of a secondary particle, but Comparative Example 2 exhibits less than 18%. In addition, the examples exhibit less than or equal to 54% of a ratio of primary particles having an aspect ratio of less than or equal to 2.5 in the outer portion of a secondary particle, but Comparative Example 2 exhibits greater than 54%.

In addition, comparing FIG. 14 with FIG. 15 based on the examples, primary particles having a large aspect ratio are more distributed in the outer portion than in the inner portion of a secondary particle.

In other words, the examples have a structure that primary particles having a large aspect ratio are more distributed in the outer portion than in the inner portion of a secondary particle, and the primary particles having a very large aspect ratio (e.g., 4 or more) are present in a high ratio (e.g., the number ratio of 18% or more). Accordingly, lithium ions may more easily move in the positive electrode active material according to embodiments of the present disclosure, thereby reducing stress resulting from contraction and expansion of the positive electrode active material during repeated charges and discharges.

Accordingly, a rechargeable lithium battery cell may realize high-capacity, and charge and discharge efficiency and cycle-life characteristics may be improved, and experiment results for this will be further described herein below.

Evaluation Example 3: Cross-Sectional Area Analysis of Primary Particles

Figure 16:
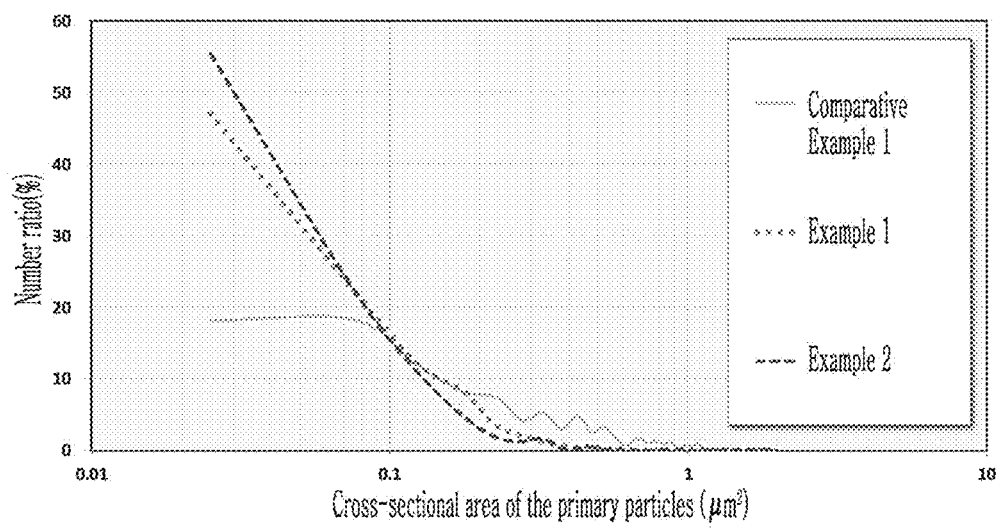
FIG. 16 is a graph showing area distributions of cross-sections of primary particles in cross-sections of secondary particles of the positive electrode active materials of Comparative Example 1, Example 1 and Example 2.

Regarding the cross-sections of the positive electrode active materials of Comparative Example 1 and Examples 1 and 2, after contouring the primary particles, an image analysis program (Image J) was used to analyze an area distribution of the cross-sections of the primary particles, and the results are shown in FIG. 16. In FIG. 16, a horizontal axis represents a cross-sectional area of the primary particles, and a vertical axis represents the number ratio.

Figure 17:
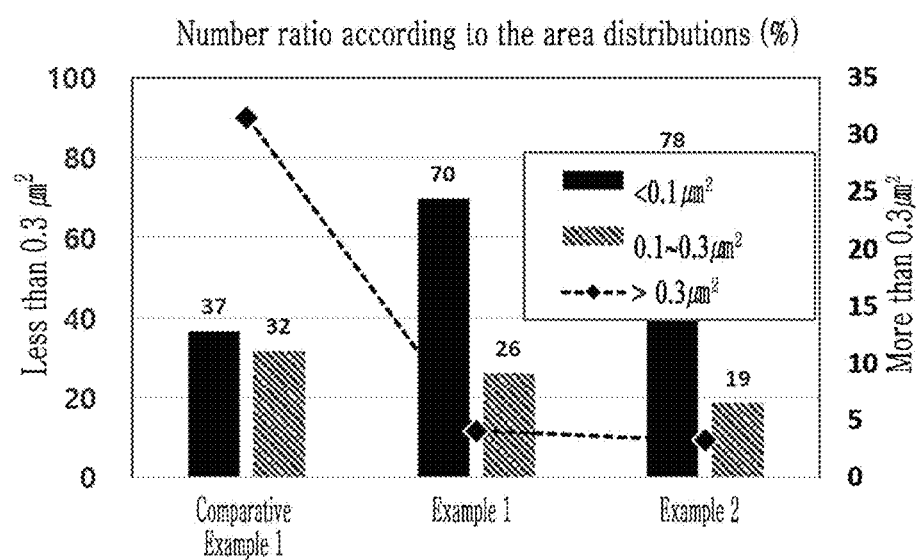
FIG. 17 is a graph showing the number ratio according to the area range of the cross-sections of the primary particles analyzed through the area distribution curves of the cross-section of the primary particles of FIG. 16.

FIG. 17 is a graph analyzed through a cross-sectional area distribution curve of the primary particles, wherein a black bar graph represents the number ratio of the primary particles having cross-sectional area of smaller than 0.1 $\mu m^2$, a hatched bar graph represents the number ratio of the primary particles having cross-sectional area of 0.1 to 0.3 $\mu m^2$, and a dotted line graph represents the number ratio of the primary particles having cross-sectional area of larger than 0.3 $\mu m^2$. The bar graph corresponds to a left vertical axis, and the dotted line graph corresponds to a right vertical axis.

Referring to FIG. 17, the number ratio of primary particles having a primary particle cross-sectional area of less than 0.1 $\mu m^2$ was 37% in Comparative Example 1 but 70% in Example 1 and 78% in Example 2, which are much higher than that of Comparative Example 1. In addition, the number ratio of primary particles having a primary particle cross-sectional area of larger than 0.3 $\mu m^2$ was about 33% in Comparative Example 1 but about 4% in Example 1 and about 3% in Example 2, which are much lower than that of Comparative Example 1.

In this way, the positive electrode active material according to one embodiment has a structure that a large number of primary particles having a small cross-sectional area are distributed, and thus, is expected to improve charge and discharge efficiency, capacity, and cycle-life characteristics.

Evaluation Example 4: Evaluation of Initial Charge/Discharge Capacity and Efficiency The battery cells according to Comparative Examples 1 and 2 and Examples 1 and 2 were charged to an upper limit voltage of 4.25 V at a constant current of 0.2 C and to 0.05 C at a constant voltage and then, discharged to a discharge cut-off voltage of 3.0 V at a constant current of 0.2 C at 25° C., which was performed as initial charge and discharge, and the results are shown in FIG. 18.

Figure 18:
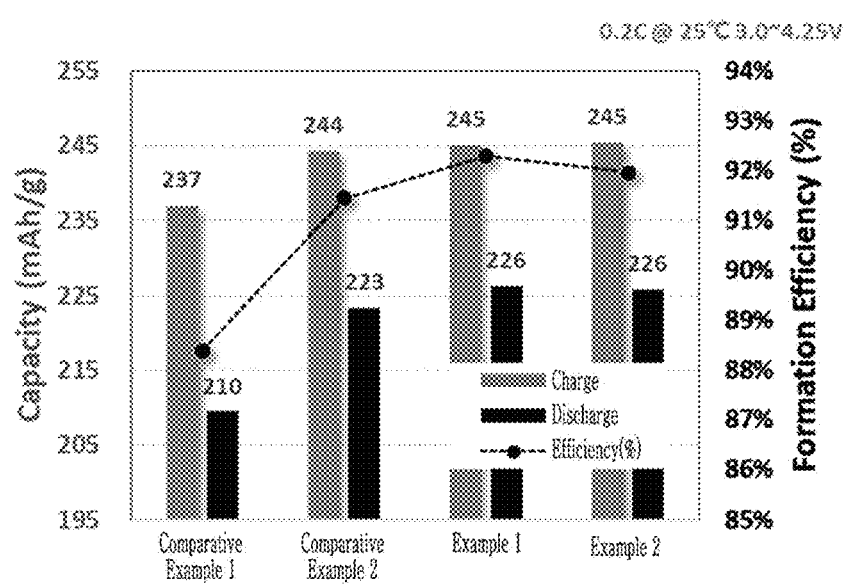
FIG. 18 is a graph showing initial charge capacity, initial discharge capacity, and initial charge/discharge efficiency of the battery cells manufactured in Comparative Example 1, Comparative Example 2, Example 1, and Example 2.

Referring to FIG. 18, Comparative Example 2 and Examples 1 and 2, to which a positive electrode active material including radially-arranged primary particles was applied, exhibit significantly increased initial charge capacity, initial discharge capacity, and initial charge and discharge efficiency (i.e., Formation Efficiency), compared with Comparative Example 1. In addition, compared with Comparative Example 2, the examples, in which primary particles having an aspect ratio of larger than 4 in the outer portion of a secondary particle were well developed and primary particles having a cross-sectional area of smaller than 0.1 $\mu m^2$ in the entire cross-section of the secondary particle were well developed, exhibit a little increased initial charge capacity and initial discharge capacity and in addition, increased initial charge and discharge efficiency.

Evaluation Example 5: Evaluation of High-Temperature Cycle-Life

Figure 19:
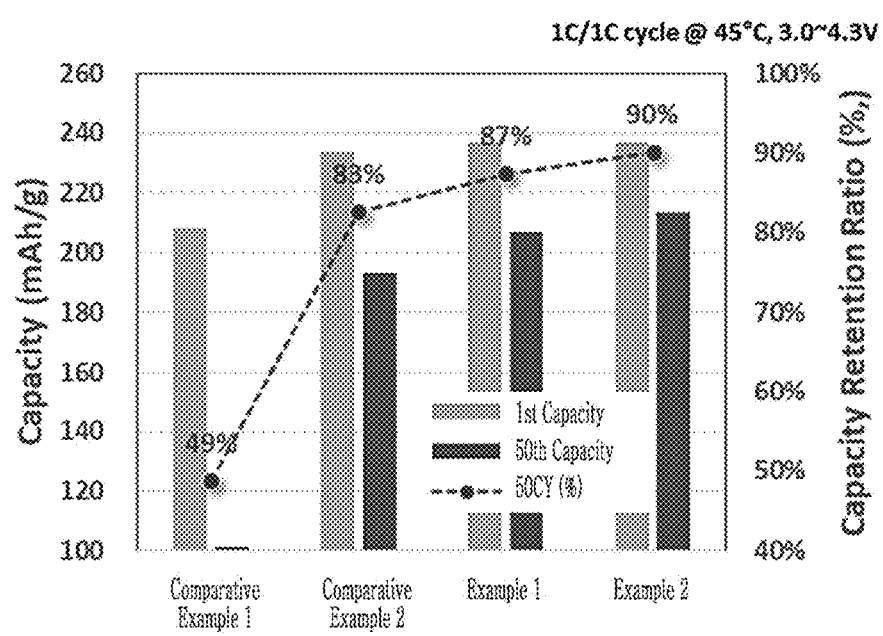
FIG. 19 is a graph showing the high-temperature cycle-life characteristics, the initial discharge capacity, the discharge capacity after 50 cycles, and the capacity retention ratios, which are the ratio of the latter to the former of the battery cells manufactured in Comparative Example 1, Comparative Example 2, Example 1, and Example 2.

The battery cells according to Comparative Examples 1 and 2 and Examples 1 and 2 were initially charged and discharged as in Evaluation Example 4 and then, 50 times repetitively charged and discharged at 1 C within a voltage range of 3.0 V to 4.3 V at 45° C. and then, evaluated with respect to cycle-life characteristics, and the results are shown in FIG. 19. FIG. 19 exhibits initial discharge capacity, discharge capacity at the $50^{th}$ cycle, and a ratio of the latter to the former as $50^{th}$ cycle capacity retention.

Referring to FIG. 19, Examples 1 and 2 exhibit all improved initial discharge capacity, $50^{th}$ cycle discharge capacity, and $50^{th}$ cycle capacity retention, compared with Comparative Examples 1 and 2. In particular, Comparative Example 2, which included a positive electrode active material of secondary particles in which primary particles are radially arranged but differs from the examples in terms of an aspect ratio distribution of the primary particles and/or area distributions of cross-sections of the primary particles, eventually exhibits deteriorated charge and discharge efficiency and cycle-life characteristics. Accordingly, in the positive electrode active material secondary particles, the aspect ratio distribution of the primary particles and/or area distributions of cross-sections of the primary particles may be controlled to improve charge and discharge efficiency of a rechargeable lithium battery cell and accomplish high-capacity and enhance high-temperature cycle-life characteristics.

Although example embodiments have been described in herein, the scope of the present disclosure is not limited thereto. In addition, it should be understood that various modifications and improvements by those skilled in the art using the basic concept defined in the appended claims, and equivalents thereof, also fall within the scope of the present disclosure.

| Description of Symbols |
| --- |
| 100: rechargeable lithium battery |
| 112: negative electrode |
| 113: separator |
| 114: positive electrode |
| 120: battery case |
| 140: sealing member |

What is claimed is:

1. A positive electrode active material for a rechargeable lithium battery, comprising:
a lithium nickel-based composite oxide, wherein the positive electrode active material is in a form of a secondary particle in which a plurality of primary particles are aggregated together and at least a portion of the primary particles are radially arranged,
the secondary particle comprises an inner portion and an outer portion, the inner portion of the secondary particle is a region from a center of the secondary particle to 50±5 length % of the total distance from the center of the secondary particle to the surface of the secondary particle, and is a region in which primary particles and pores are irregularly arranged, the outer portion of the secondary particle is the remaining region surrounding the inner portion, wherein at least a portion of the primary particles are radially arranged in the outer portion, and
a number ratio of the primary particles having an aspect ratio of greater than or equal to about 4 in the outer portion of the secondary particle is greater than or equal to about 18%.

2. The positive electrode active material of claim 1, wherein:
the number ratio of the primary particles having an aspect ratio of greater than or equal to about 4 in the outer portion of the secondary particle is about 18% to about 45%.

3. The positive electrode active material of claim 1, wherein:
a number ratio of the primary particles having an aspect ratio of less than or equal to about 2.5 in the outer portion of the secondary particle is less than or equal to about 54%.

4. The positive electrode active material of claim 1, wherein:
the number ratio of the primary particles having an aspect ratio of greater than or equal to about 4 in the outer portion of the secondary particle is three times or more of a number ratio of the primary particles having an aspect ratio of greater than or equal to about 4 in the inner portion of the secondary particle.

5. The positive electrode active material of claim 1, wherein:
a number ratio of the primary particles having an aspect ratio of greater than or equal to about 4 in the inner portion of the secondary particle is about 5% to about 15%.

6. The positive electrode active material of claim 1, wherein:
a number ratio of the primary particles having an aspect ratio of less than or equal to about 2.5 in the inner portion of the secondary particle is less than or equal to about 71%.

7. The positive electrode active material of claim 1, wherein:
in a cross-section of the secondary particle, a ratio of the number of primary particles having a cross-sectional area of less than 0.1 μm$^2$ is greater than or equal to about 70%.

8. The positive electrode active material of claim 7, wherein:
in the cross-section of the secondary particle, the ratio of the number of primary particles having a cross-sectional area of less than 0.1 μm$^2$ is about 70% to about 90%.

9. The positive electrode active material of claim 7, wherein:
in the cross-section of the secondary particle, a ratio of the number of primary particles having a cross-sectional area of greater than about 0.3 μm$^2$ is less than or equal to about 5%.

10. The positive electrode active material of claim 1, wherein:
an average particle diameter (D50) of the secondary particle is about 8 μm to about 20 μm.

11. The positive electrode active material of claim 1, wherein:
the lithium nickel-based composite oxide is represented by Chemical Formula 1:

$$Li_{a1}Ni_{x1}M^1_{y1}M^2_{1-x1-y1}O_{2-z}X_z \quad \text{[Chemical Formula 1]}$$

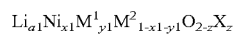

wherein, in Chemical Formula 1, $0.9 \le a1 \le 1.8$, $0.3 \le x1 \le 1$, $0 \le y1 \le 0.7$, and $0 \le z \le 0.1$, $M^1$ and $M^2$ are each independently at least one element selected from Al, B, Ba, Ca, Ce, Co, Cr, Fe, Mg, Mn, Mo, Nb, Si, Sr, Ti, V, W, and Zr, and X is at least one element selected from F, P, and S.

12. A method of preparing a positive electrode active material for a rechargeable lithium battery, comprising:
mixing together a positive electrode active material precursor including a nickel-based composite hydroxide and a lithium raw material, and heat-treating the resultant to obtain the positive electrode active material of claim 1,
wherein the heat-treating includes a temperature-raising process and a temperature-maintaining process, and a temperature-raising time is longer than a temperature-maintaining time.

13. The method of claim 12, wherein:
the temperature-raising time is about 6 hours to about 16 hours,
the temperature-maintaining time is about 1 hours to about 9 hours.

14. The method of claim 12, wherein:
a ratio of (the temperature-raising time):(the temperature-maintaining time) is about 1.1:1 to about 10:1.

15. The method of claim 12, wherein:
the heat-treatment is performed at about 600° C. to about 900° C.

16. A rechargeable lithium battery, comprising:
a positive electrode including the positive electrode active material of claim 1,
a negative electrode, and
an electrolyte.

* * * * *